US010044666B2

(12) United States Patent
Carter

(10) Patent No.: US 10,044,666 B2
(45) Date of Patent: Aug. 7, 2018

(54) SYSTEM FOR COMMUNICATING BETWEEN DEVICES

(71) Applicant: Sean Carter, Brooklyn, NY (US)

(72) Inventor: Sean Carter, Brooklyn, NY (US)

( * ) Notice: Subject to any disclaimer, the term of this patent is extended or adjusted under 35 U.S.C. 154(b) by 0 days.

(21) Appl. No.: 14/326,897

(22) Filed: Jul. 9, 2014

(65) Prior Publication Data

US 2016/0014069 A1    Jan. 14, 2016

(51) Int. Cl.
*H04L 12/58* (2006.01)

(52) U.S. Cl.
CPC .............. *H04L 51/32* (2013.01); *H04L 51/04* (2013.01)

(58) Field of Classification Search
CPC .................................. H04L 51/32; H04L 51/04
See application file for complete search history.

(56) References Cited

U.S. PATENT DOCUMENTS

| | | | | |
|---|---|---|---|---|
| 2013/0204692 A1* | 8/2013 | Mallory | ................. | G06Q 50/01 705/14.36 |
| 2014/0011594 A1* | 1/2014 | Diaz | ....................... | G07F 17/32 463/42 |
| 2014/0095399 A1* | 4/2014 | Smith | ................ | G06Q 10/1053 705/321 |
| 2014/0180959 A1* | 6/2014 | Gillen | ................ | G06Q 10/0838 705/341 |
| 2014/0324629 A1* | 10/2014 | Jacobs | ................... | G06Q 30/02 705/26.41 |
| 2015/0246281 A1* | 9/2015 | Originale Di Criscio | ................ | A63F 13/12 463/31 |
| 2015/0304270 A1* | 10/2015 | Cook | .................... | H04L 65/403 709/206 |

OTHER PUBLICATIONS

Wikipedia, "Gowalla", Apr. 27, 2014, 3 pages.*

* cited by examiner

*Primary Examiner* — Brian J. Gillis
*Assistant Examiner* — Chhian Ling
(74) *Attorney, Agent, or Firm* — Dwayne L. Bentley, Esq.; DL Bentley Law Group PLLC

(57) ABSTRACT

A computer implemented method of communicating between devices is disclosed. This method includes: selecting a plurality of options associated with a specialized program; selecting at least one option from the plurality of options; inserting a responsive question associated with the selected at least one option; selecting at least one first message and at least one second message associated with the responsive question; transmitting the responsive question associated with the selected at least one option with the at least one first message and the at least one second message; and receiving the at least one first message and the at least one second message, wherein the at least one first message and the at least one second message is shared to a plurality of users.

8 Claims, 38 Drawing Sheets

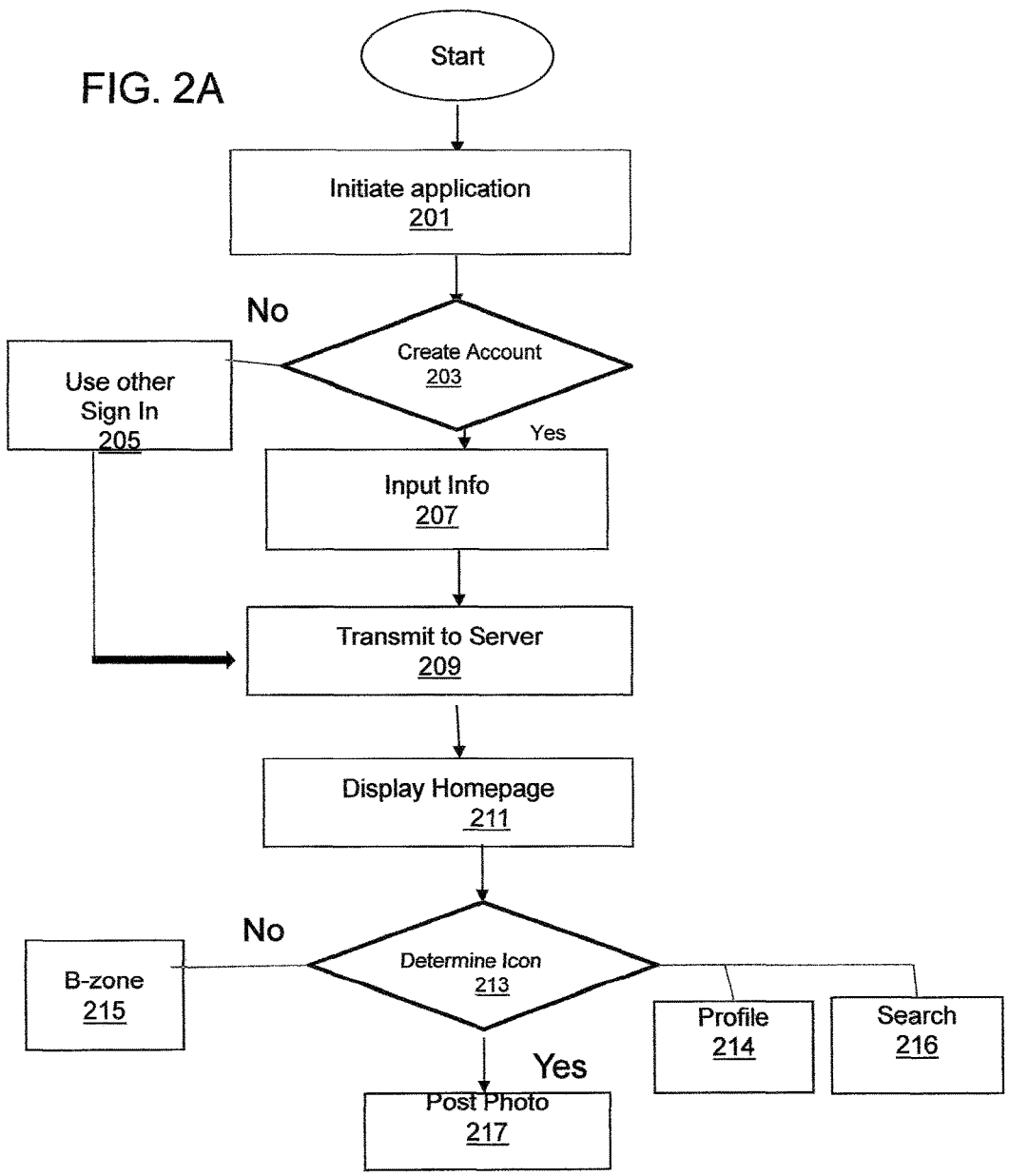

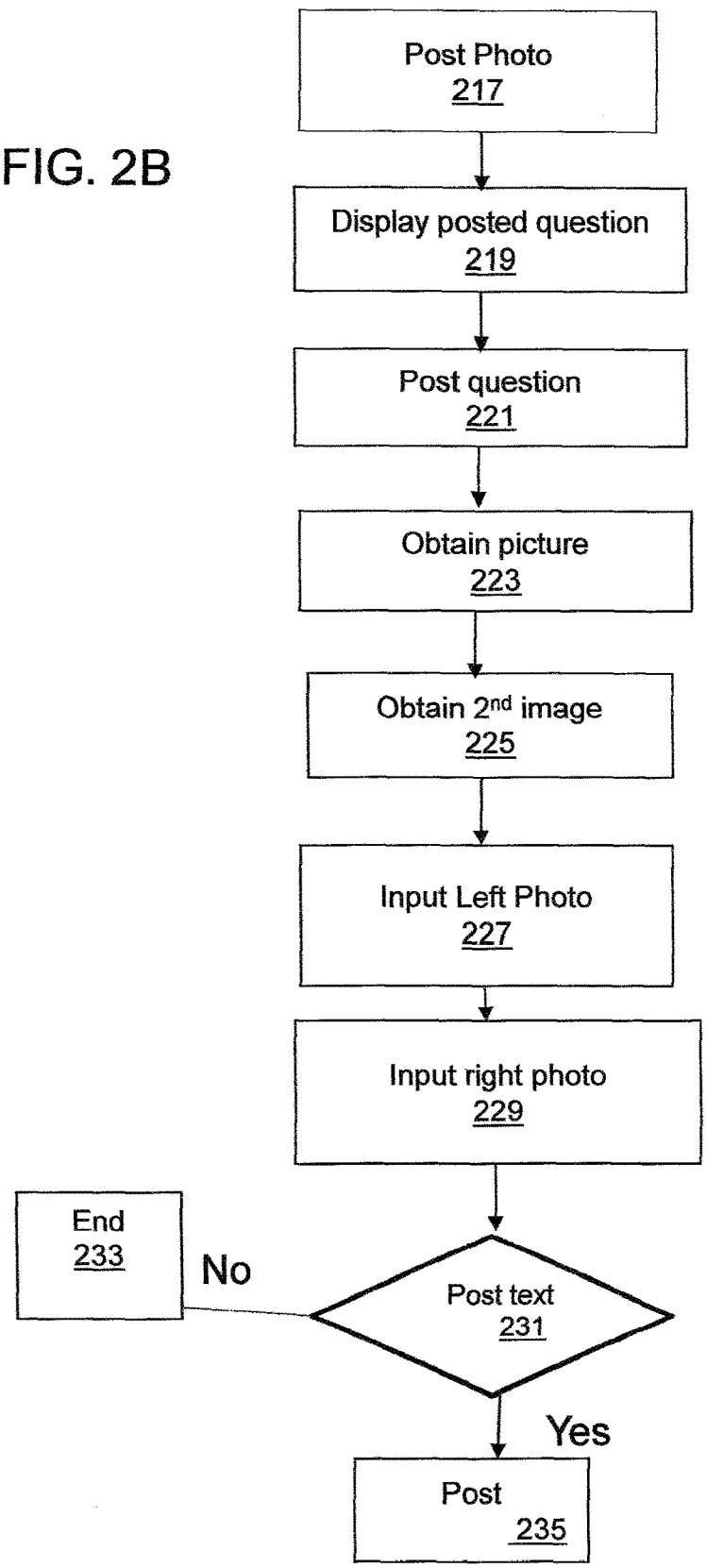

FIG. 3

Account  (For security, create a difficult password)
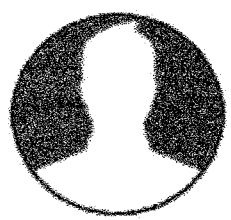
Edit
👤 Username
🔒 Password
🔒 Confirm Password
Profile
✉️ Email
 Name
📱 Phone (Optional)
FIG. 4

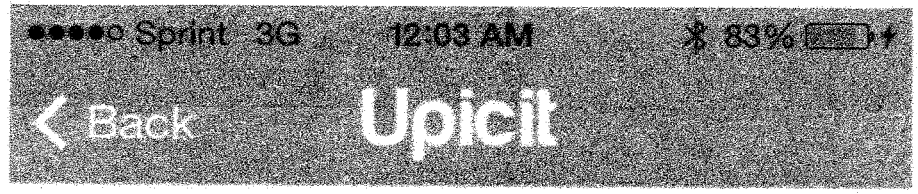
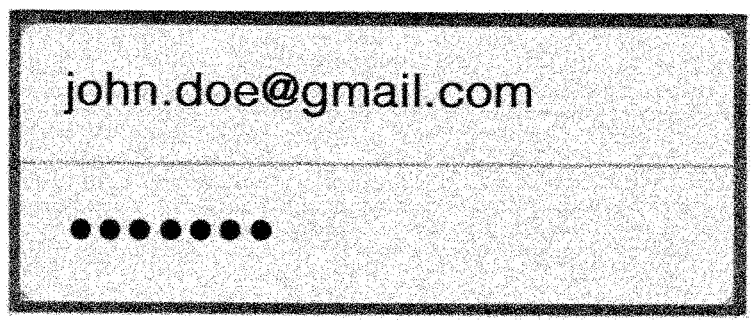
FIG. 5

•••• Sprint 3G     5:57 PM     ✻ 51% 🔋
Cancel     New Message
To:
Cc/Bcc,From: John.Doe@gmail.com
Subject:
Share Image by UBLife
 ItsAmazing     8d
Battle
What's better in office
•••
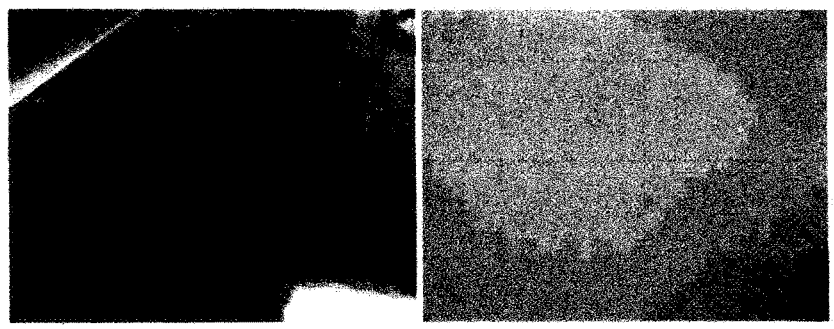
FIG. 8

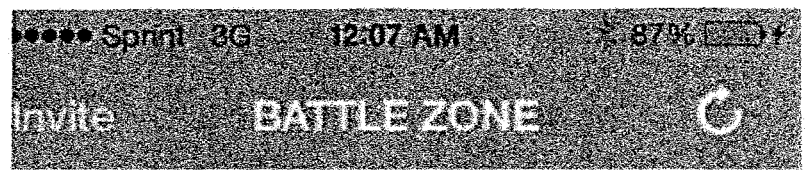
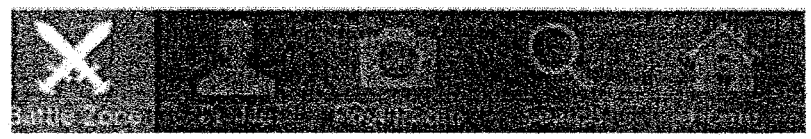
FIG. 10

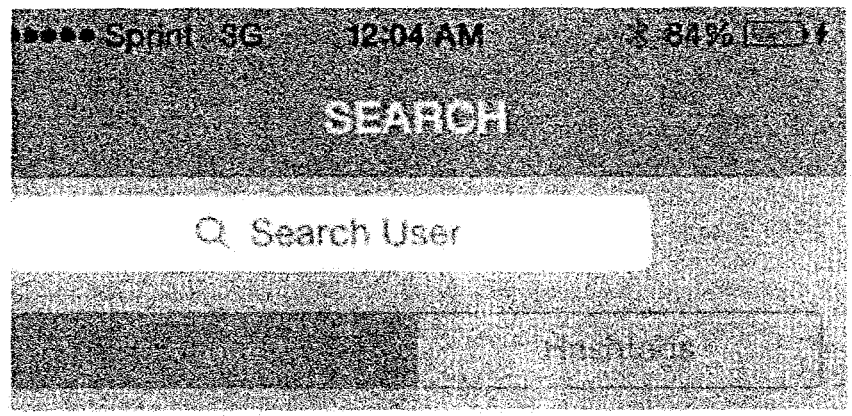
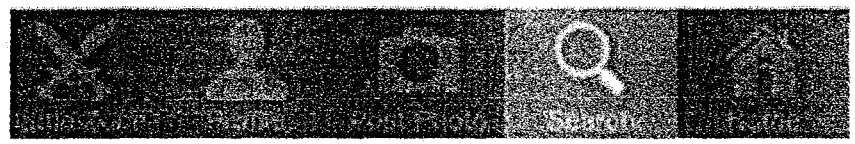
FIG. 11

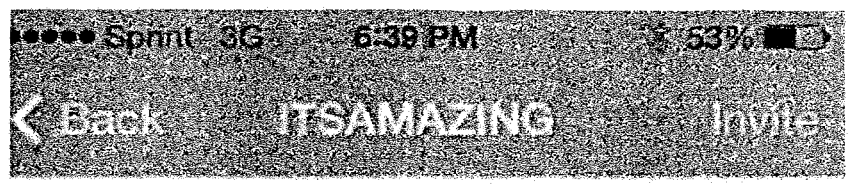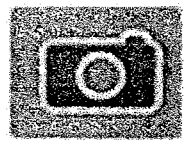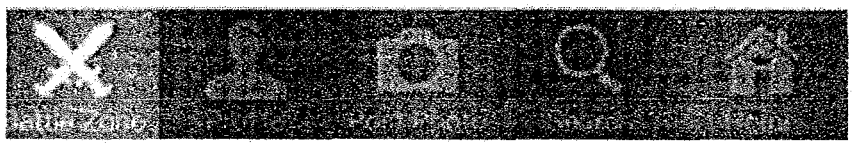
FIG. 13

Account
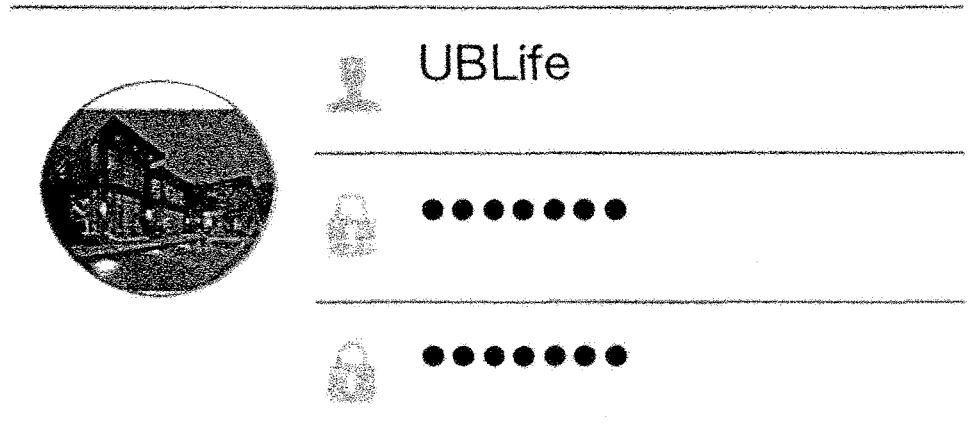
Profile
john.doe@gmail.com
John Doe
555-555-6655
FIG. 16E

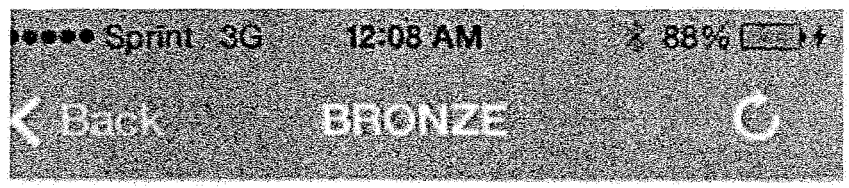
VIEW OPTION
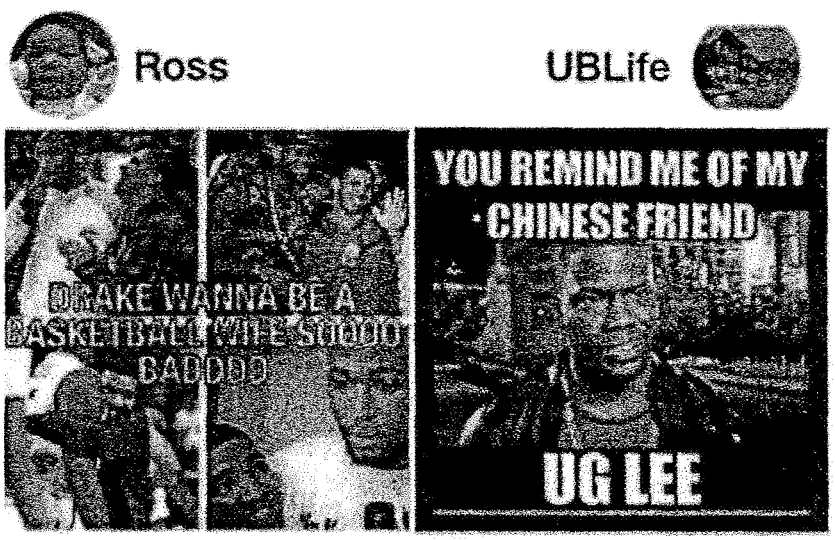
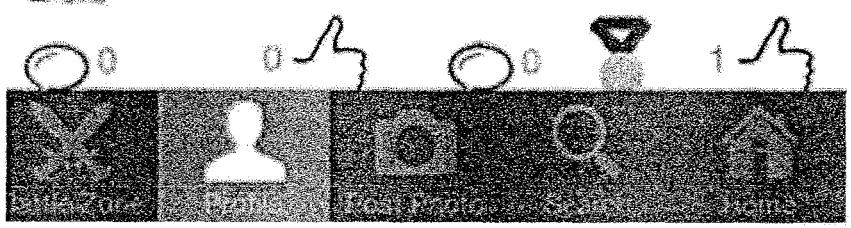
FIG. 16F

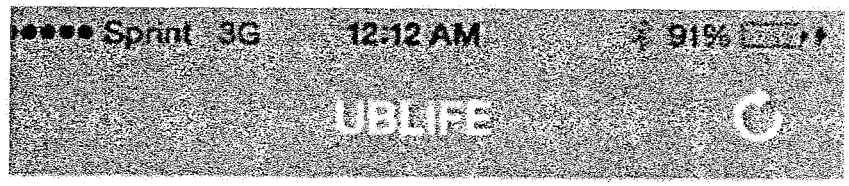
VIEW OPTION    TAGGED
Which baby is cuter???  @ublife
North            Sebastian
  
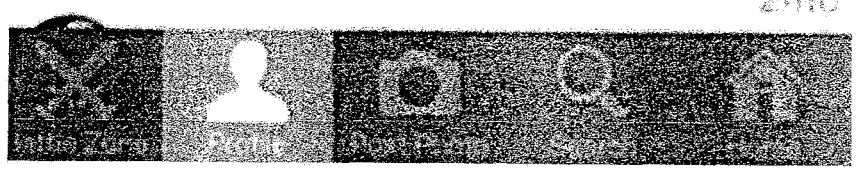
FIG. 16H

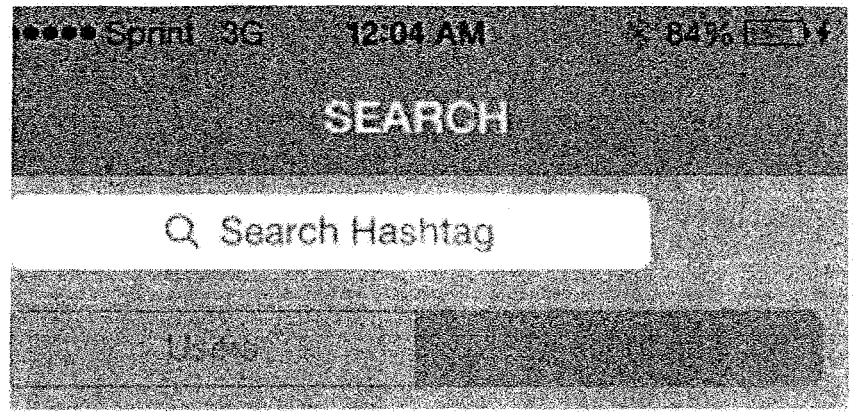
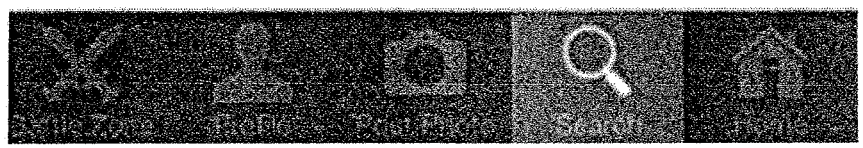
FIG. 17A

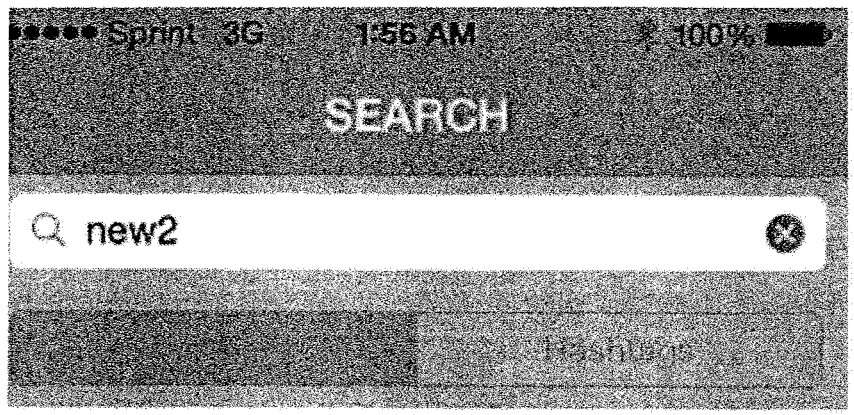
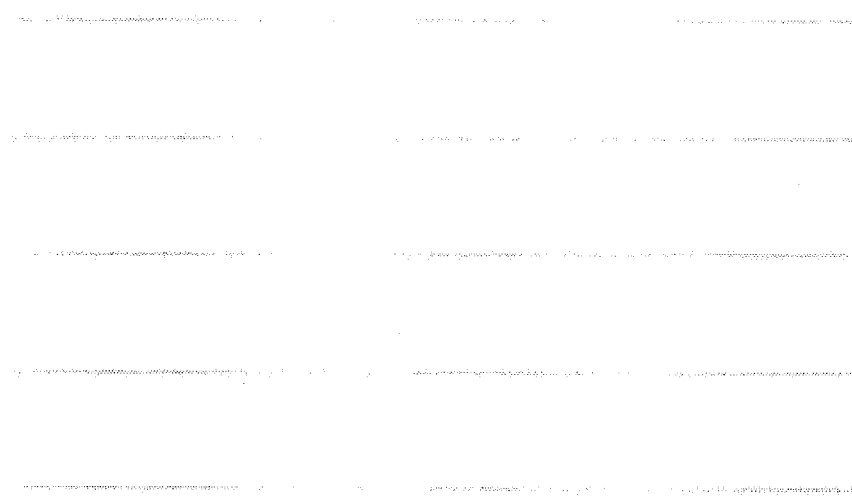
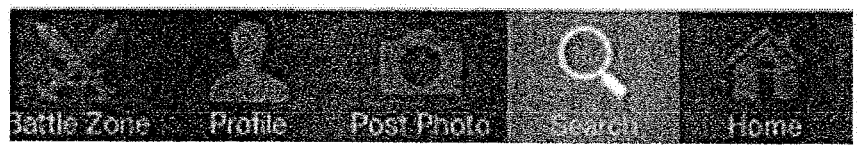
FIG. 17B

Blah Blah Blah
Yup yup yup
Huh huh huh
What what what
www.new2.com
 This user is Private
FIG. 17C

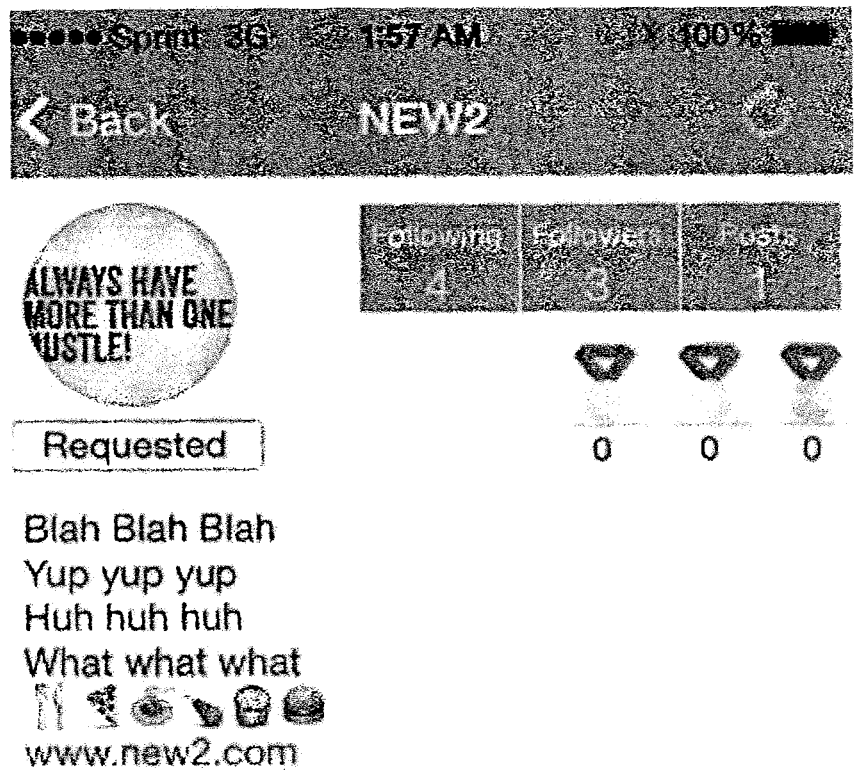
FIG. 17E

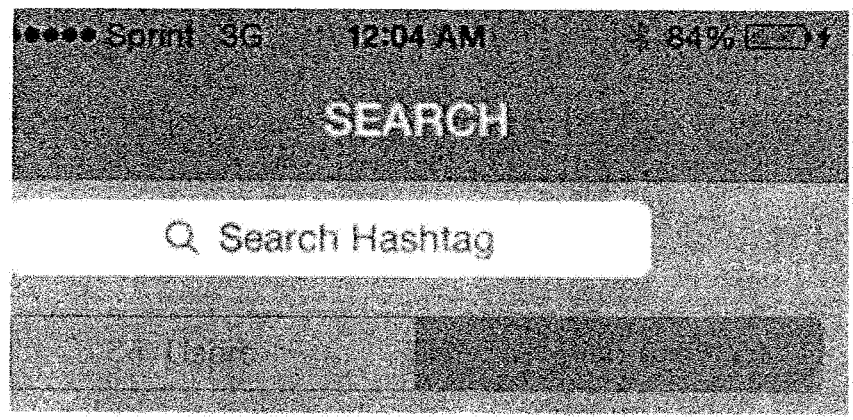
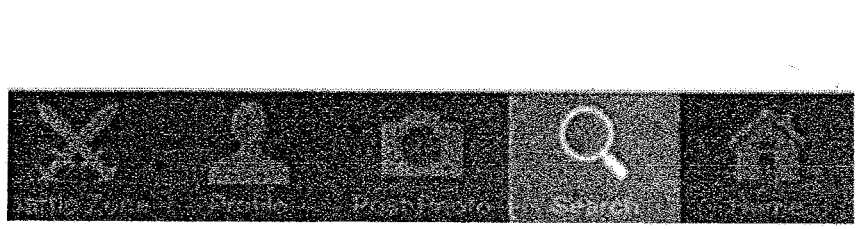
FIG. 17F

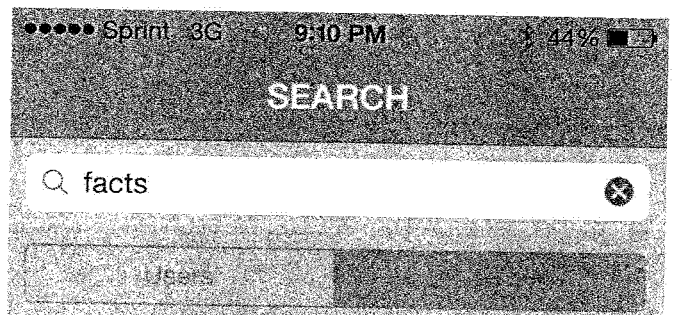
facts        5 posts >
FIG. 17G

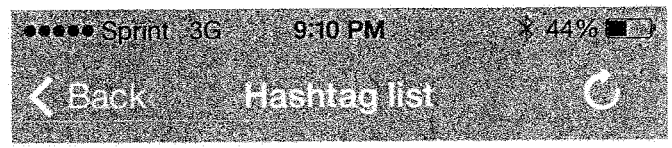
VIEW OPTION
This is crazy! #facts @itsamzing   
FIG. 17H

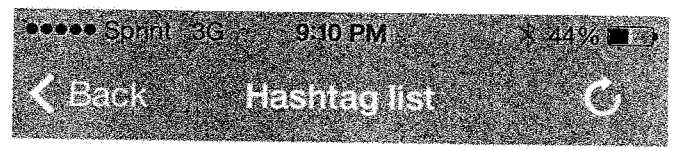
VIEW OPTION
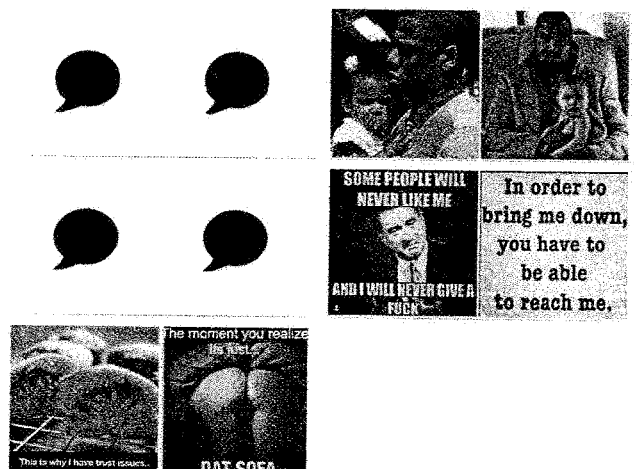
FIG. 17I

SYSTEM FOR COMMUNICATING BETWEEN DEVICES

FIELD OF THE INVENTION

The present invention relates to a system for communicating between devices.

BACKGROUND OF THE INVENTION

Generally, mobile phones have become ubiquitous in our society lending itself to be in the daily lives of many people. Most people utilize the myriad of applications on cell phones but there are some applications that haven't been developed. As it is now people are constantly comparing different products but there's no software application that allows one to compare at least two objects. Thus, there is a need for an application that allows devices to compare one or more objects.

SUMMARY OF THE INVENTION

The present invention has been accomplished in view of the above-mentioned technical background, and it is an object of the present invention to provide a computerized system for comparing at least two message between devices.

In a preferred embodiment of the invention, a computer implemented method of communicating between devices is disclosed. This method includes: selecting a plurality of options associated with a specialized program; selecting at least one option from the plurality of options; inserting a responsive question associated with the selected at least one option; selecting at least one first message and the at least one second message associated with the responsive question; transmitting the responsive question associated with the selected at least one option with the at least one first message and the at least one second message; and receiving the at least one first message and the at least one second message, wherein the at least one first message and the at least one second message is shared to a plurality of users.

In another preferred embodiment of the invention, a system for sharing messages between devices is disclosed. A first device connected and second device connected to an analysis server, where the analysis server includes a specialized application program. The analysis server provides the first device and the second device with access to the specialized application program, responsive to the first device receiving access to the specialized application program the first device is configured to transmit a message to the second device. The second device is configured to determine if the second device will respond to the message from the first device, wherein the second device responding to the message from the first device, the first device is configured to select at least one option from a plurality of options associated with the specialized application program. The first device is configured to insert a responsive question associated with the selected at least one option from the plurality of options. The first device selects at least one first message associated with the inserted responsive question associated with the selected at least one option from the plurality of options, wherein the first device transmits the inserted responsive question associated with the selected at least one option from the plurality of options and the at least one first message through the analysis server to the second device, wherein the second device responsive to receiving the inserted responsive question associated with the selected at least one option from the plurality of options and the at least one first message the second device transmits at least one second message through the analysis server to the first device. The analysis server is configured to share the inserted responsive question associated with the selected at least one option from the plurality of options, the at least one first message from the first device and the at least one second message from the second device to a plurality of registered members, wherein the analysis server is configured to allow at least one vote by each of the plurality of registered members on the at least one first message and the at least one second message.

BRIEF DESCRIPTION OF THE DRAWINGS

These and other advantages of the present invention will become more apparent as the following description is read in conjunction with the accompanying drawings, wherein:

FIGS. 2A and 2B show flow charts of how communication occurs between a first device and the analysis server of FIG. 1 in accordance with the invention;

FIG. 3 shows an example of a screen shot of the Upicit screen page in accordance with the invention;

FIG. 4 shows an example of a screen shot of a Sign-up page of FIG. 3 in accordance with the invention;

FIG. 5. shows an example of a screen shot of a Login page of FIG. 3 in accordance with the invention;

FIG. 8 shows an example of a screen shot of a sharing email option of FIG. 3 in accordance with the invention;

FIG. 10 shows an example of a screen shot of an initial Battle-Zone application invite of FIG. 9 in accordance with the invention;

FIG. 11. shows an example of a screen shot an initial search for Battle-Zone of FIG. 10 in accordance with the invention;

FIG. 13 shows an example of a screen shot showing the initialization of the Battle-Zone of FIG. 9 in accordance with the invention;

FIGS. 16A-16J shows examples of screen pages associated with a Profile Icon in accordance with the invention; and FIGS. 17A-17J shows examples of screen pages associated with a Search Icon in accordance with the invention.

DETAILED DESCRIPTION OF THE INVENTION

The presently preferred embodiments of the invention are described with reference to the drawings, where like components are identified with the same numerals. The descriptions of the preferred embodiments are exemplary and are not intended to limit the scope of the invention.

Figure 1:
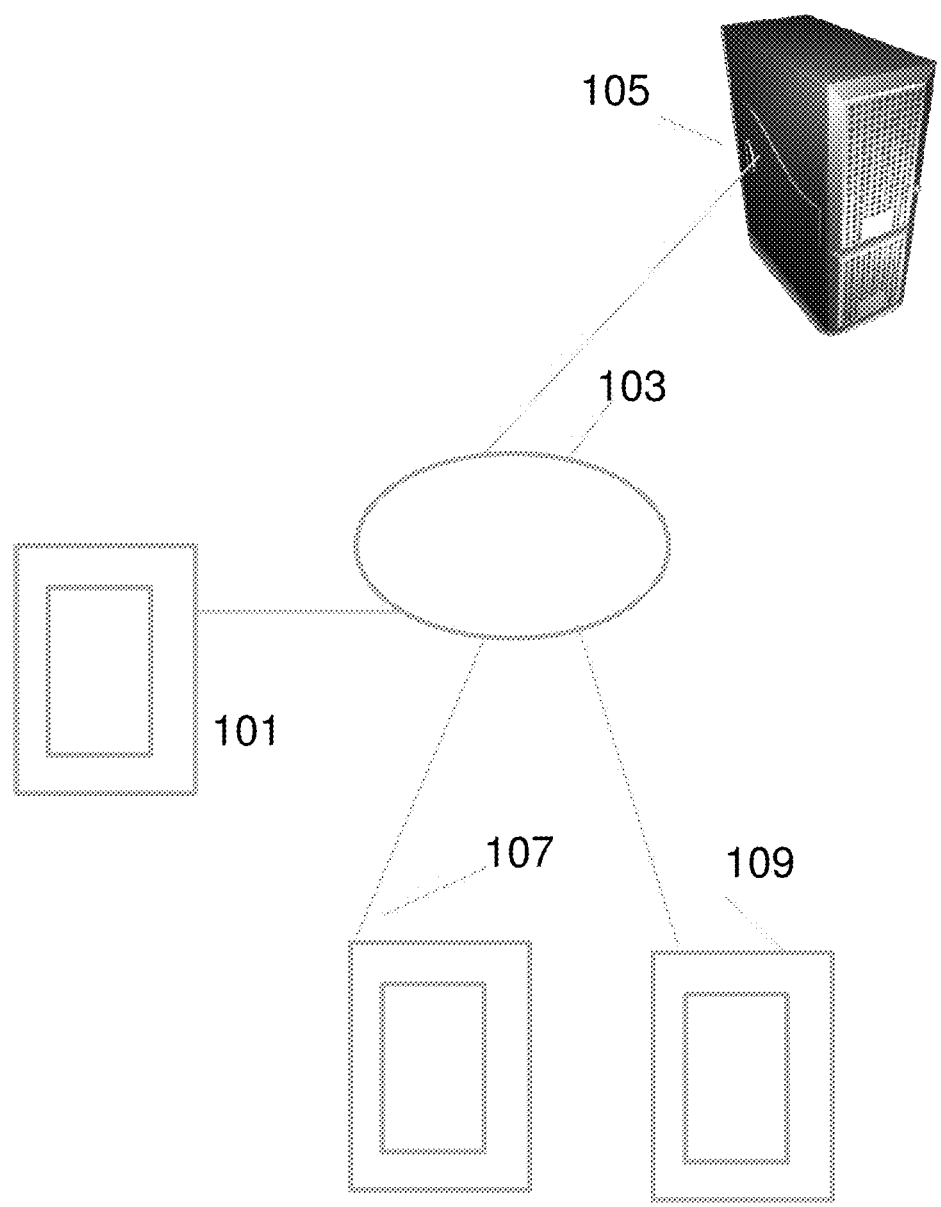
FIG. 1 is a schematic representation of information flow in a communication system in accordance with the invention.

FIG. 1 is a schematic representation of information flow in a communication system. The communication system 100 includes: a first device 101, a web interface 103, an analysis server 105, an optional second device 107 and an optional third device 109. First device 101 is connected through a communication link, such as web Interface 103 to the analysis server 105, optional second device 107 and optional third device 109. The communication link may be a local access network (LAN), wireless access network, wide area network (WAN), a virtual area network, wireless fidelity (Wi-Fi) network, Bluetooth, an Ethernet link, a satellite link, cable link, cellular, fiber-optic or any network that can facilitate the transfer of information between computer systems. The first device 101 includes an actual person/consumer that utilizes the first device 101. First device 101, the optional second device 107 and the optional third device 109 may be any type of computer system including a desktop, laptop, notebook, mobile computer system, a tablet computing system, cell phone, smartphone, mobile phone or any type of computing system. This first device 101 is connected to web Interface 103, which connects it to the analysis server 105, the optional second device 107 and the optional third device 109.

Analysis server 105 may also be referred to as the Upicit (Pending Trademark Application Ser. No. 86/271,425) server. The analysis server 107 is equivalent to a typical server or computer system that includes a processor, mass storage and memory. The analysis server 107 also includes a special application program or algorithm stored on the processor which will be described in FIGS. 2A, 2B, 9, 16A-16J and 17A-17J. The term "Upicit" represents software application program stored on the analysis server that allows a registered Upicit software application user to compare and rate one or more objects or messages. Typical software programs are a set of programs, procedures, algorithms and documentation which are integral to the operation of a data processing system.

FIG. 2A is a flow chart showing actions by a first device communication with the analysis server of FIG. 1 of the communication system. First device 101, in this example, is a mobile phone or smartphone. The labels first device 101 and the analysis server 105 are simply indicative of the device that is seeking information and the devices that are providing information. Of course, the roles of the first device 101 and the analysis server 105 may be reversed as appropriate. In addition, the use of the singular form is not meant to be limiting; the first device 101 and the analysis server 105 could be one device or a number of devices combined into a system or subsystem. Further, a person has downloaded the Upicit software application from the ITunes store, Google Play or any appropriate digital downloading store or service onto the first device 101 in order to utilize the Upicit software stored on the analysis server 105.

At block 201, a person utilizes first device 101 by clicking on the Upicit Icon to initialize the Upicit software application so the person at the first device 101 can access the screenshot of the Upicit Login Page as shown in FIG. 3. This screen shot of the Login Page serves as a starting point for accessing information shown on this screen page. FIG. 3 illustrates the Upicit logo, a Facebook® sign in Icon, a Twitter® Sign in Icon or Create an Upicit Account sign and an Icon that asks "Already have an account? Log In." Facebook is a registered trademark of Facebook Inc. located at 1601 Willow Road, Menlo Park, Calif. 94025. Twitter is a registered trademark of Twitter Inc. located at 1355 Market Street, Suite 900, San Francisco, Calif. 94103. Also, another option is utilize Instagram in place of Facebook or Twitter. Instagram is a registered trademark of Instagram Inc. located at 181 South Park Avenue, San Francisco, Calif. 94107.

Referring to FIG. 2A, at block 203, the person at the first device 101 determines if he wants to sign in through his Facebook Account, Twitter Account, Upicit Account or sign-up for a Upicit Account. At block 205, the user decides to use either his Facebook Account, Twitter Account or Upicit Account that is transmitted to the analysis server 105 at block 209. Any one of the aforementioned ways to Login will allow the user to access the Upicit software. At block 207, the user at first device 101 decides to create an Upicit account, as shown in FIG. 4, where he/she inputs his/her name, email address, password and picture as inputted information. For this invention, the user utilizes the first device 101 to perform tasks on first device 101. At block 209, this inputted information is then transmitted to the analysis server 105 where it is saved on the analysis server 105, as shown in FIG. 5, and this inputted information is also saved on the Upicit application stored on first device 101. In order to fully disclose and understand the Upicit software application, the Upicit application includes the following Upicit Application Button acronyms and the 5 Main Button acronyms are shown below:

| Upicit App Buttons: | The 5 Main Buttons on the bottom of the Upicit App: |
|---|---|
| FS—Face book Sign In | HSB—Home Screen Button |
| TS—Twitter Sign In | BSB—Battle Screen Button |
| CUA—Create Upicit Acct | SSB—Search Screen Button |
| LI1—Log in Upicit 1 | PLSB—Profile Screen Button |
| BK—Back | PSB—Post Screen Button |
| J—Join | |
| LI2—Log in Upicit 2 | |
| PP—Profile Pic | |
| U1—Username | |
| R—Refresh | |
| B—Battle | |
| RIB—Right Invite Battle | |
| LIB—Left Invite Battle | |
| O—Options | |
| LCP—Left Camera Post | |
| LC—Left Comment | |
| LNL—Left Number of Likes | |
| LL—Left Likes | |
| RCP—Right Camera Post | |
| RC—Right Comment | |
| RNL—Right Number of Likes | |
| RL—Right Likes | |
| U2—Username2 | |
| BQ—Battle Question | |
| TP—Text Post | |
| CP—Camera Post | |
| VP—Video Post | |
| CA—Camera | |
| GY—Gallery | |
| CL—Cancel | |
| FO—Face book Option-Sharing | |
| TO—Twitter Option-Sharing | |
| EO—Email Option-Sharing | |
| CO—Cancel Option-Sharing | |
| SP—Spam Posting | |
| TU—Tag User | |
| SUP—Share Upicit Posting | |
| TG—Tag | |
| SB—Search Bar | |
| CK—Check-Tag | |
| PC—Post Comment | |
| LTP—Left Text Post | |
| RTP—Right Text Pos | |
| HW—Hashtag Word | |

| Upicit App Buttons: | The 5 Main Buttons on the bottom of the Upicit App: |
|---|---|
| UM—User Mention | |
| USB—User Search | |
| HSB—Hashtag Search | |
| U3—Username3 | |
| AR—Arrow | |
| FB—Follow | |
| UFB—Unfollow | |
| BU—Block User | |
| RB—Requested | |
| VO—View Option | |
| DP—Delete Posting | |
| P—Post | |
| LVP—Left Video Post | |
| RVP—Right Video Post | |
| CV—Capture Video | |
| FN—Following | |
| FR—Followers | |
| S—Settings | |
| N—Notifications | |
| GM—Gold Medals | |
| SM—Silver Medals | |
| BM—Bronze Medals | |
| WL—Web Link | |
| TG2—Tagged Post | |
| E—Edit | |
| PC—Post Comment | |
| AC—Accept | |
| RJ—Reject | |
| B2—Battle 2 | |
| U4—Username4 | |
| U5—Username5 | |
| U6—Username6 | |
| SE—Save Edit | |
| RV—Record Video Limit | |
| BS—Blue Search | |
| BO—Bio | |

Figure 6A:
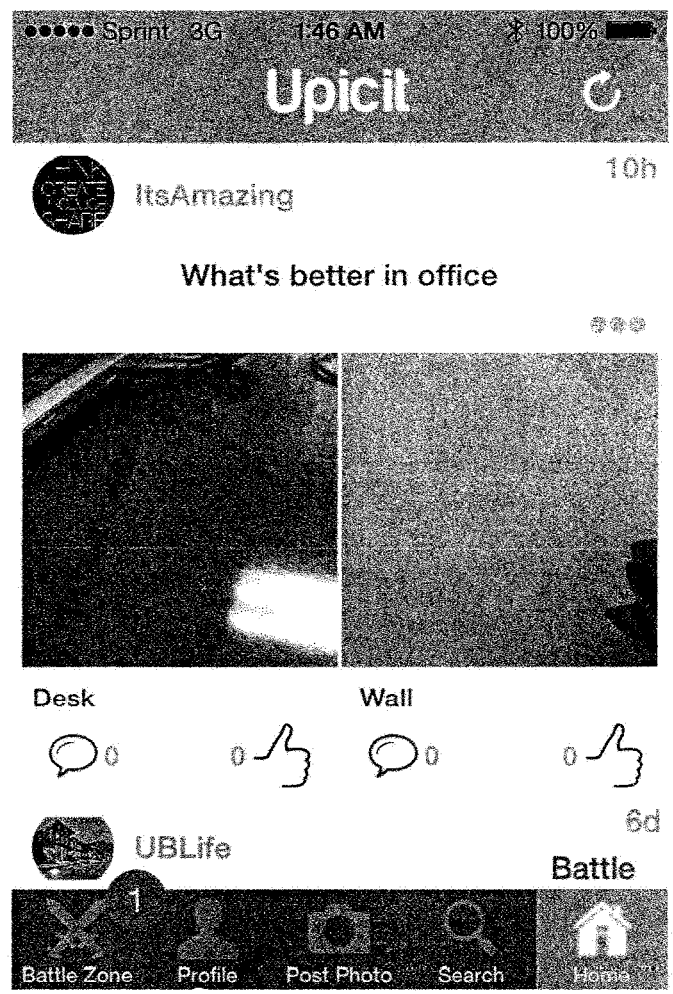
FIGS. 6A and 6B show examples of screen shots of a Home page and a Post Photo Page of FIG. 3 in accordance with the invention.

Next, at block 211, the first device 101 displays the Upicit homepage of FIG. 6A where there are Icons on the bottom of the screen page: Battle Zone, Profile, Post Photo, Search and Home. Next, at block 213 the person at first device 101 determines which icon he wants to choose. These Icons may also be known as plurality of options where one of the options may be selected. For the Home page Icon, this is the place where the Upicit registered members compares 2 or more messages between 1 or more users of this Upicit software application and the Upicit registered members can vote on the 2 or more messages. There are several components to comparing that includes several types of messages: 1. Post a Question (What's better in Office) 2. Capture a first image (image of a desk) 3. Capture a second Image (image of a wall), 4. Left caption (Desk) and 5. Right caption (Wall). At block 215, the user selects the Battle zone (B-Zone) Icon which is a process fully disclosed in FIG. 9.

Figure 16A:
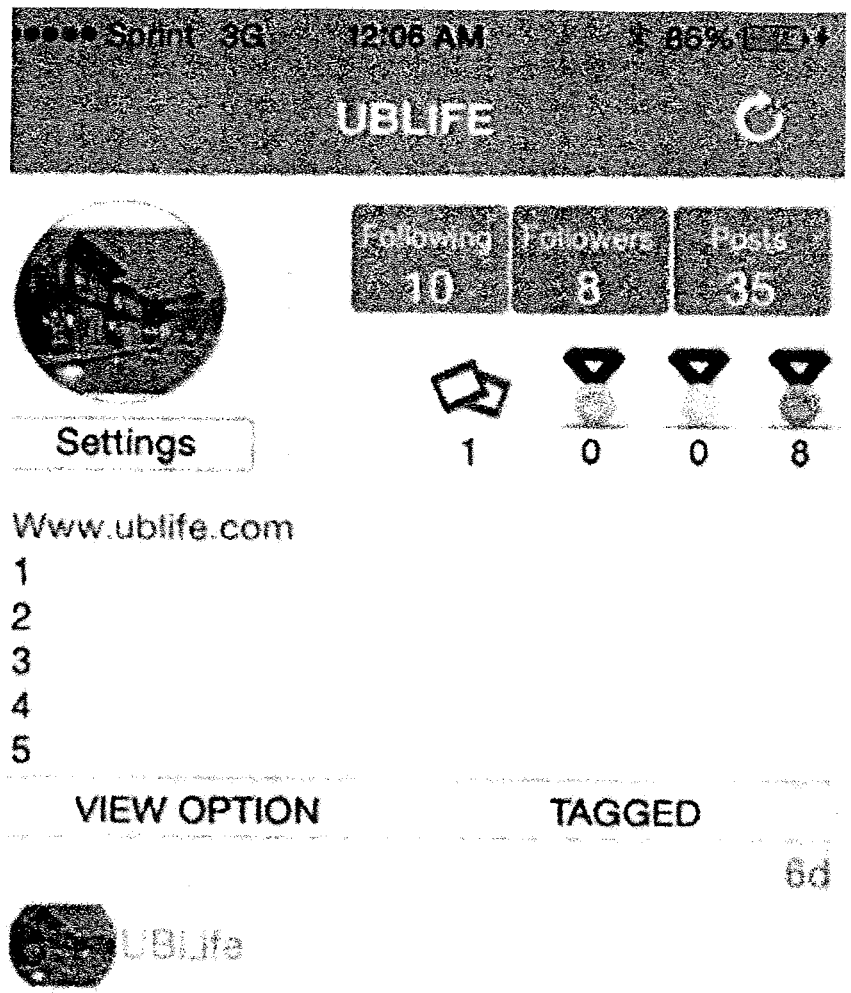
Figure 16B:
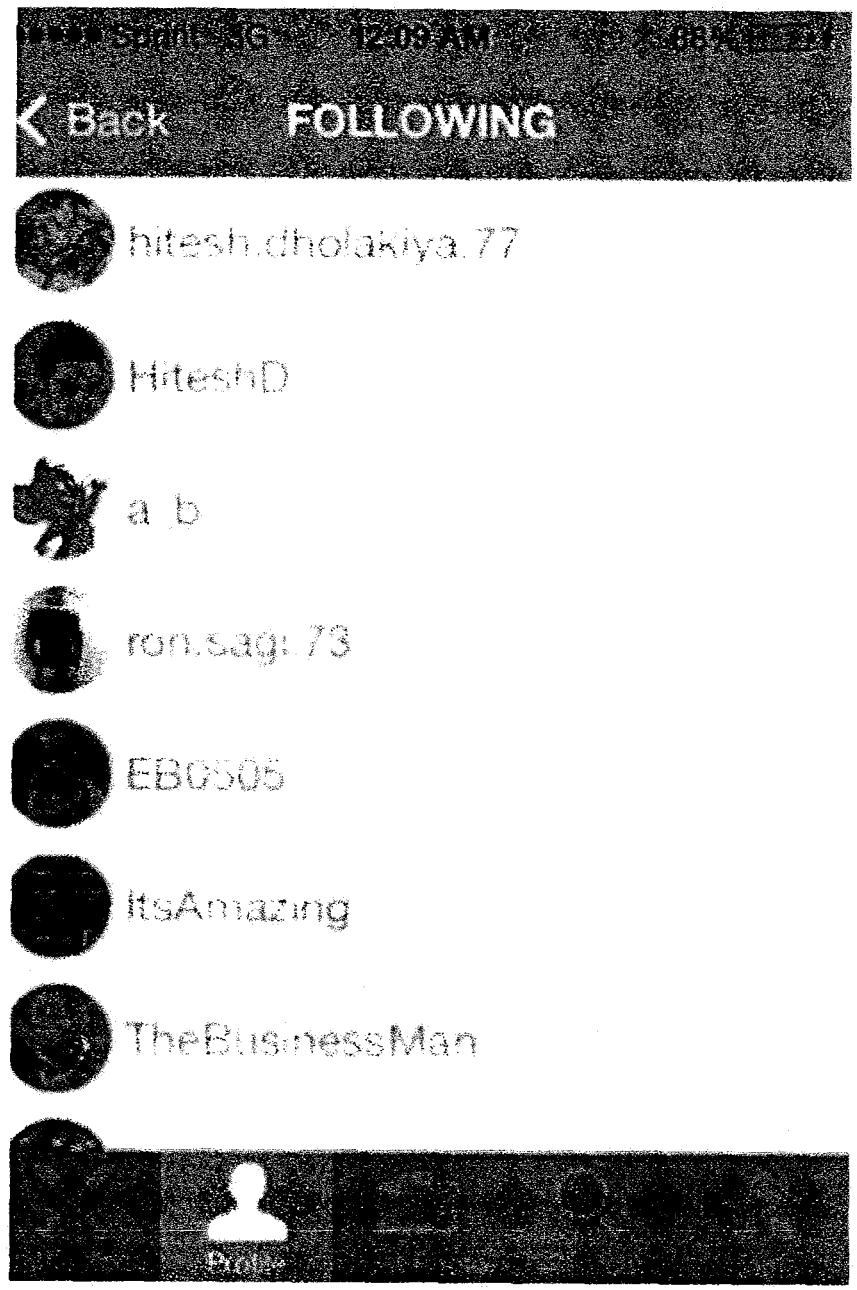
Figure 16C:
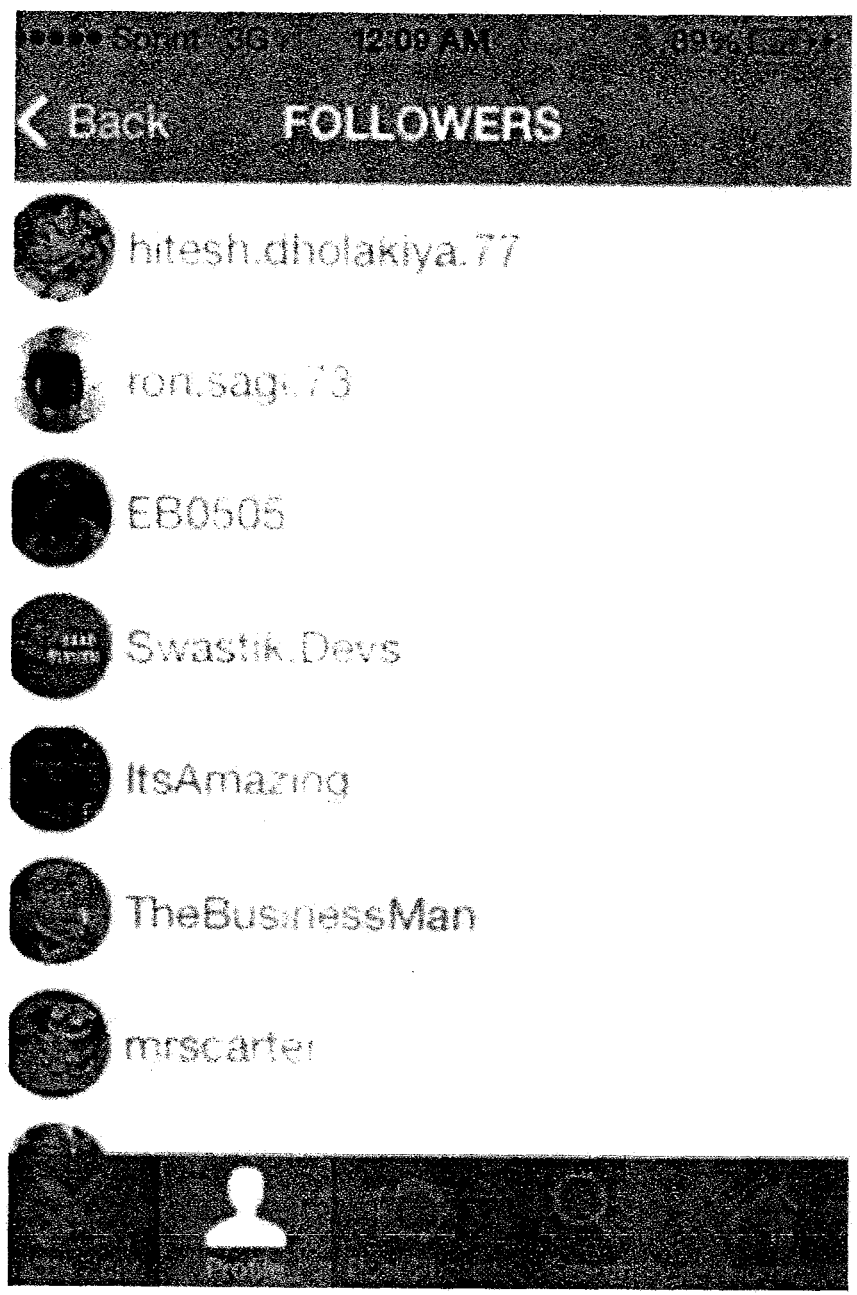

As another option, the user at block 214 selects the Profile Icon. This Profile Icon is used to show all the information associated with the Upicit registered user, where each Upicit registered user will have their own Profile screen page that can be displayed by any other Upicit registered user. An example of how the Profile Icon is utilized by the Upicit application is discussed in FIGS. 16A-16J. For example, FIG. 16A shows an example screen shot profile Page for UBLife. In UBLife's Profile page there is shown in a top right portion: 1. a Following button that when pressed displays a list of people following UBLife shown in FIG. 16B, 2. a Followers button that when pressed displays a list of UBLife followers shown in FIG. 16C and 3. Posts showing the number of posts made by UBLife. The people that UBLife is following is shown in FIG. 16B, which shows a listing of Followers on the screen page, these people Hitesh.dholakiya.77, HiteshD, a_b, ron.sagi.73, EB0505, ItsAmazing and TheBusinessMan are all Upicit registered users that UBLife is following to create a social media networking application for Upicit registered users. The Followers page of FIG. 16C shows all the Upicit registered users that are following UBLife such as Hitesh.dholakiya.77, ron.sagi.73, EB0505, Swastik.Devs, ItsAmazing, The Business Man and mrscarter.

Figure 16D:
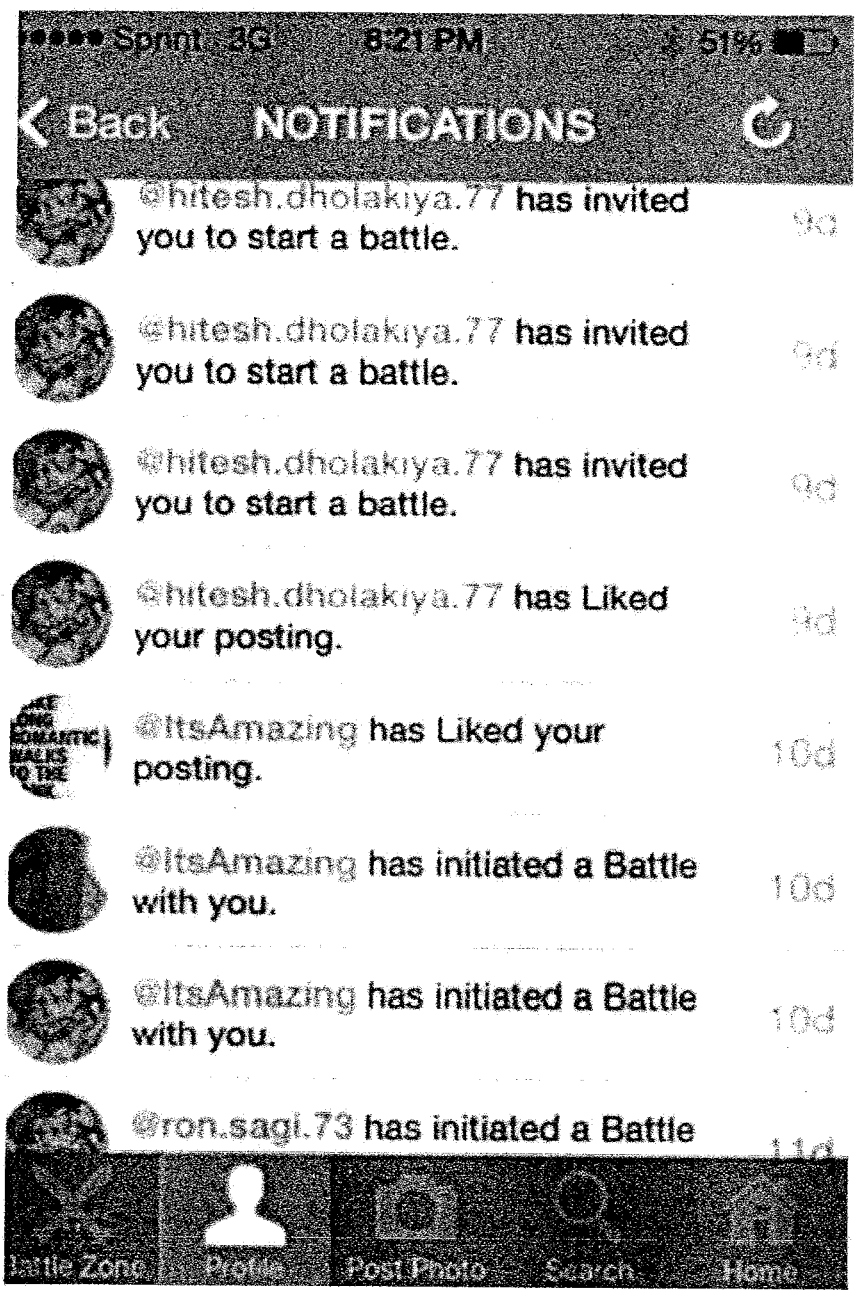
Figure 16G:

Referring to FIG. 16A, a left side of UBLife's Profile Page includes: 1. A Settings button that when pressed allows the User to Edit their Profile info that they entered in the Account Area of the Sign up page (as shown in FIG. 16E), 2 Notification Button that when pressed displays the notification list page and the Number of Notifications (as shown in FIG. 16D), 3. an optional Web Link button of www.ublife.com that's created by the UBLife user by typing a Web Link in the Bio area of the user's Account Area of the Profile Page. Referring to the Notifications screen shot page of FIG. 16D, there is a comprised list of Notifications for UBLife such as: 1. @hitesh.dholakiya 77 has invited you to start a battle, 2. @ItsAmazing has Liked Your posting, 3. @ItsAmazing has initiated a Battle with You and 4. @Ron. sagi73 has engaged in a Battle. These Notifications are from people that are either following UBLife or being followed by UBLife so when a Battle is initiated, a posting is put up or any communication occurs between these linked Followers it will show in the Notifications portion of UBLife or any other Upicit registered member. Returning to FIG. 16E, the Settings page of FIG. 16E, UBLife can input his Account information such as his UserName, Profile Picture, password and password confirmation, email address, name and phone number. Returning to FIG. 16A, there is a Bio portion on the left middle portion of the screen page where UBLife may put optional info when creating or editing his Upicit Account. Also, the right side of the UBLife Profile page includes three medal buttons based on the Likes UBLife receives during the length of a Battle Zone application. The three medals are: 1. a gold medal button that when pressed displays a gold medal page, 2 a silver medal button that when pressed displays a silver medal page and 3. a bronze medal button that when pressed displays a bronze medal page as shown in FIGS. 16F and 16G.

Figure 16I:
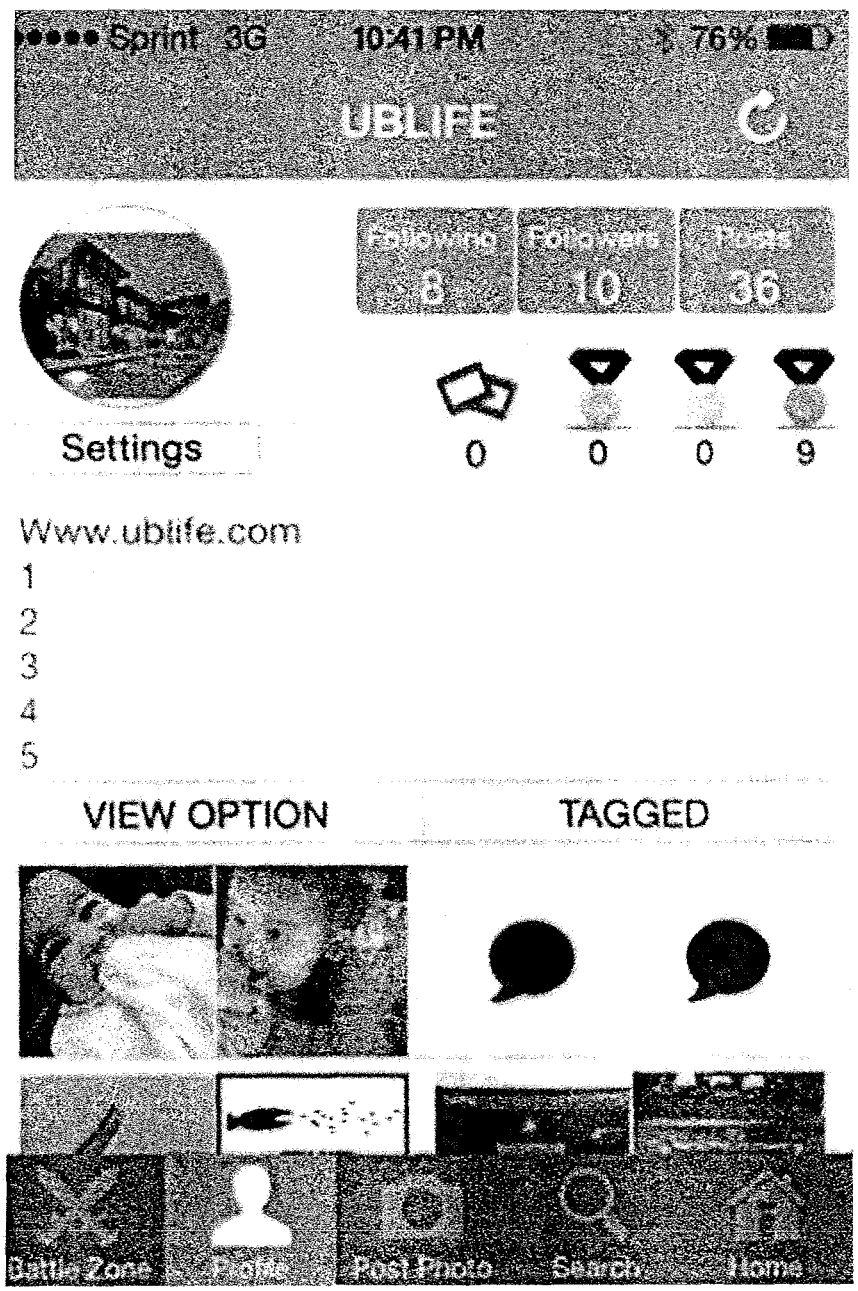
Figure 16J:
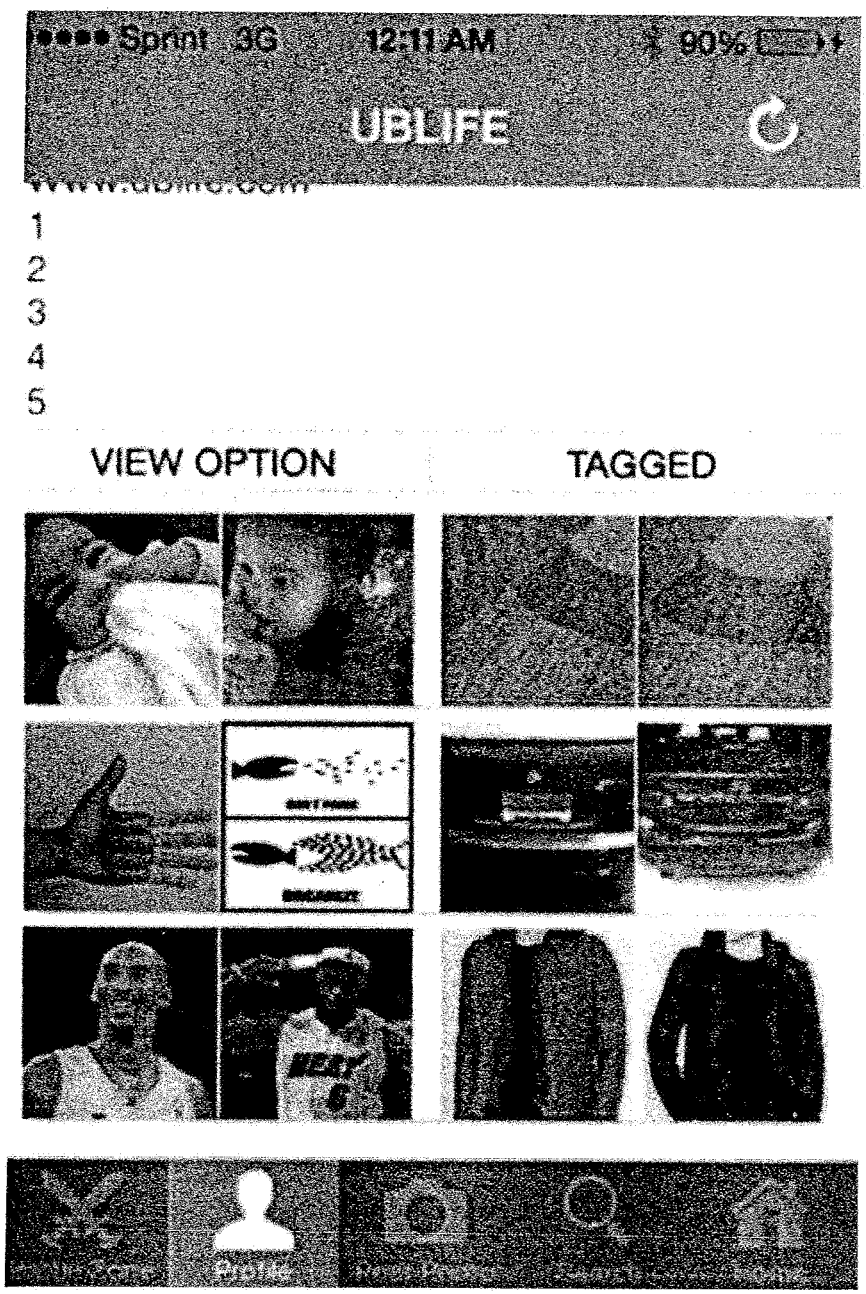

Referring to FIG. 16F, where the screen shot of a Bronze Medal page is shown if first device 101 were to click on the Bronze Button the first device 101 would be sent to this page which includes: 1. View Option (Scroll or Side by Side View), 2. Battle question, 3. Another User Profile Picture, 4. UBLife Profile picture, 5. Another User Left camera post, 6. UBLife right camera post and 7. A thumbs up showing there is 1 vote for UBLife showing he won the Bronze medal. For FIG. 16G, the View Option shows all a SidebySide View option of all the different pictures where a Bronze medal was won by UBLife. For FIG. 16H, there is a TAGGED post screen page that has a TAGGED button that allows UBLife to see all the Upicit Post that are Tagged by other users. This screen page shows a Tagged post Page in Scroll view, where the user UBLIFE can scroll through all the pictures that have been Tagged in FIG. 16I shows the Tagged photos from UBLife Profile page that are in a side by side view while FIG. 16J shows the Tagged photos from UBLife in a Side by Side view where 12 different pictures are displayed.

As another option, the user may click on the Search button at block 216. An example of the how the Search button may be fully utilized is disclosed in FIGS. 17A-17I. For FIG. 17A, when the user clicks on the Search button he's immediately taken to the Search page where he can search for a Upicit Registered member. At FIG. 17B, the user can search for the Upicit registered member by typing in the User 3 name, such as new2 with the Keyboard then the user presses the Search Button to locate new2 next to an Arrow button.

Figure 17D:
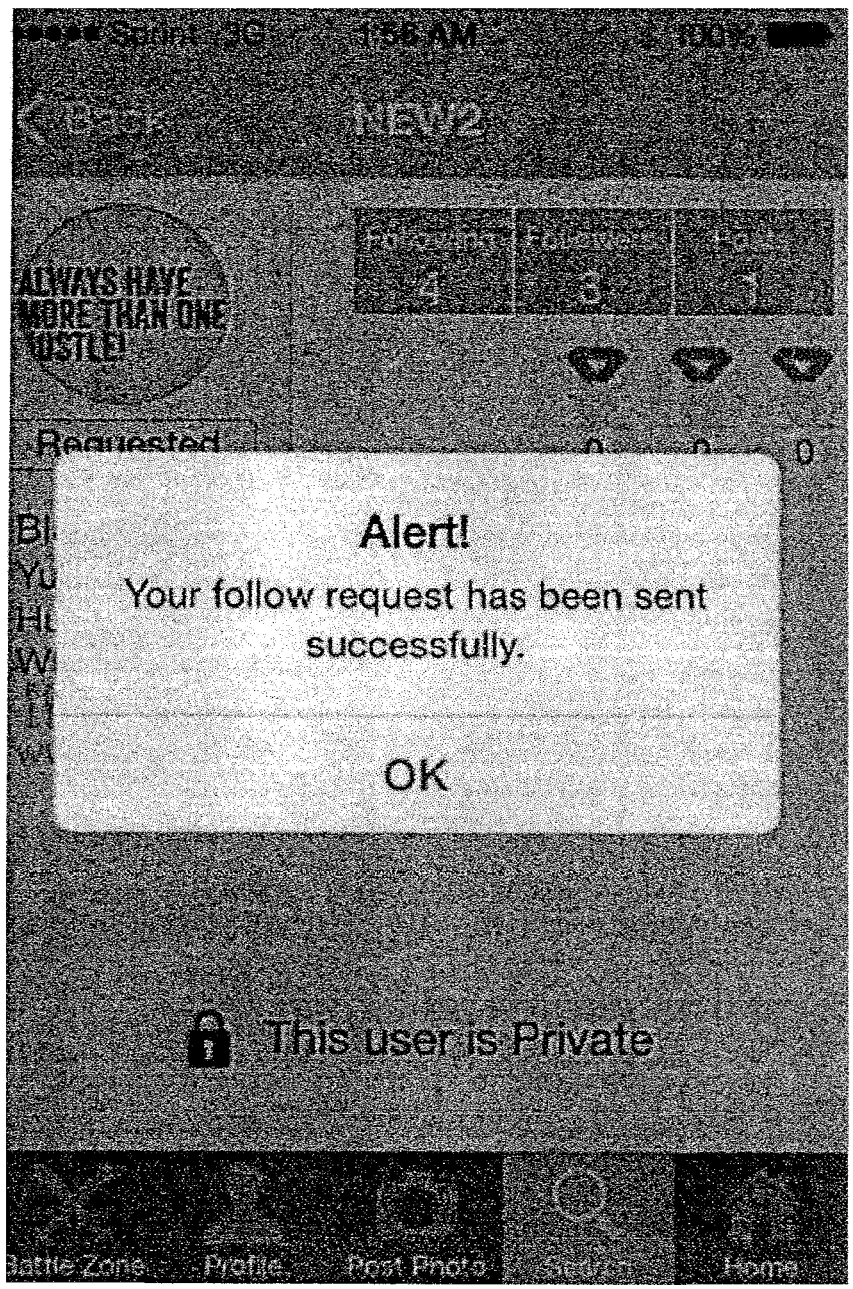
Figure 17J:

At FIG. 17C, the user new2 is located on a separate screen page or new2 Profile page that includes: 1. Following Button with 4 followers, 2. Followers Button showing 3 Followers and 3. Posts shows of 1, 4. A follow Button, 5. Block User and a Private Page is shown the Search screen page. The Follow button allows the user to send a Follow Request to user new2 because new2 Profile Page is set to Private page. This Private page notation is an option that the user or new2 can choose to stop other users from viewing their post unless the other users is already following the user, which is an option that can only be made after checking the Privacy check Box in the Setting area of a user's Profile Page. Also, this screen page has a Block User Button that allows a user to stop another user from being able to find their Profile Page and or send them a Follow Request where this Follow Request Box Page is displayed after the Follow Request Button is pressed as shown in FIG. 17D. In addition, FIG. 17D shows an Alert Box that the follow request has been sent successfully. Next, at FIG. 17E there is a screen page showing a Request Button Page where there is a button that indicates a Follow Request was made from another user and after the Follow Request Box so that new2 can decide if he/she wants to be followed. At FIG. 17F, there is a screen page showing a Search that occurs based on searching a Hashtag word where the user clicks on the Hashtag button then search for a particular Hashtag. FIG. 17G shows a screen page where, for example the Hashtag "facts" is searched for and there are 5 posts for this Hashtag next to an Arrow Button when this arrow button is pressed there is a link to a Hashtag list showing one of the times that the Hashtag "facts" is used. FIG. 17H shows the Hashtag list with a View Option, the Profile of User UBLife, a text post, a question "Who has the Best Father and Daughter Pic?" @ublife in a Scroll View Page. Next, at FIG. 17I is the Hashtag list is shown in a Side by Side View option where all of the Hashtags "facts" are shown side by side to each other. Next, there is a screen page of FIG. 17J of all the Text Posts for the Profile page of UBLife with an O option button. This Option button is utilized to instantly transfer this screen page to an operable O option screen page.

Figure 6B:
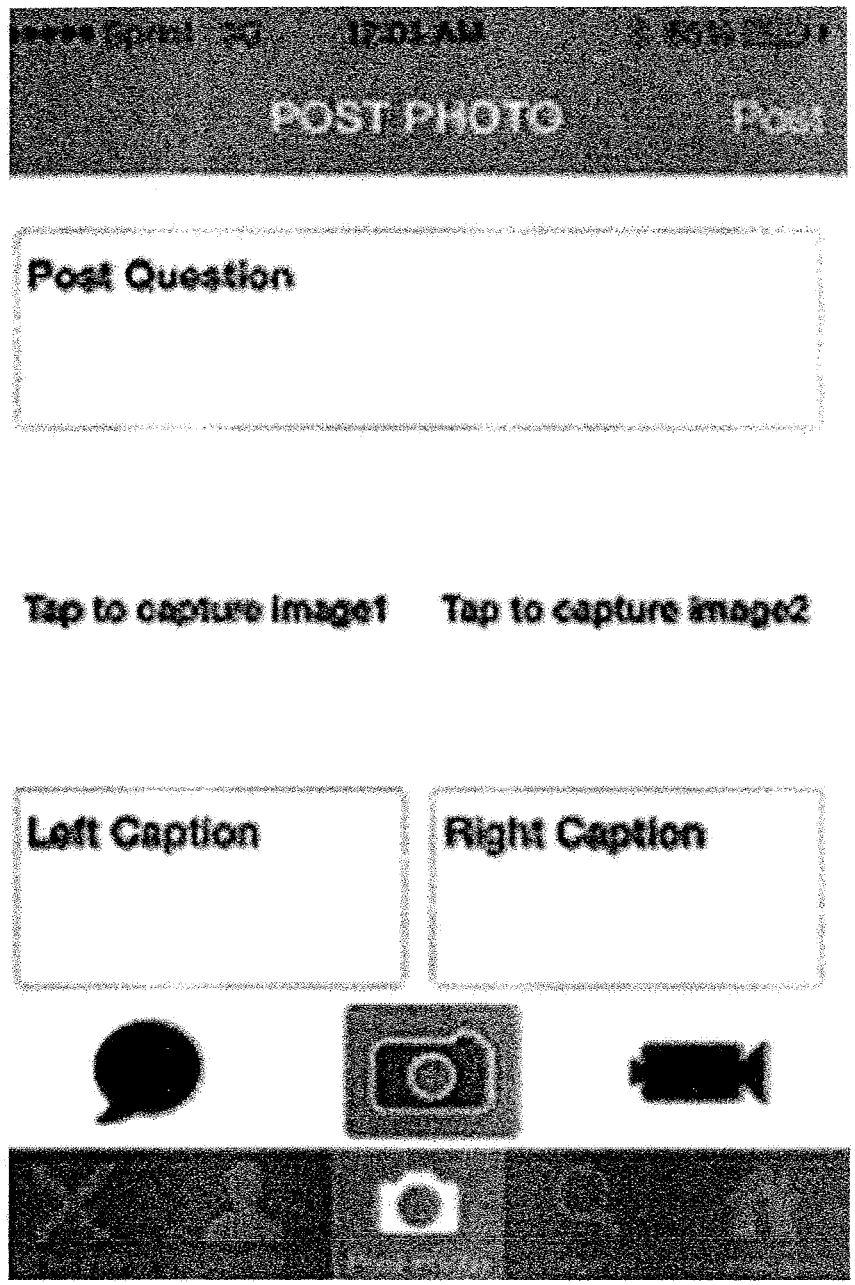

Next, as another option at block 217, the user selects to Post a Photo Icon. This Post a Photo Icon is the first step in comparing 2 or more messages between 1 or more users of this Upicit software application as shown on FIG. 6B there are several components to Posting a Photo that includes several types of messages: 1. Post a Question 2. Capture a first image 3. Capture a second Image, 4. Left caption and 5. Right caption.

Figure 7A:
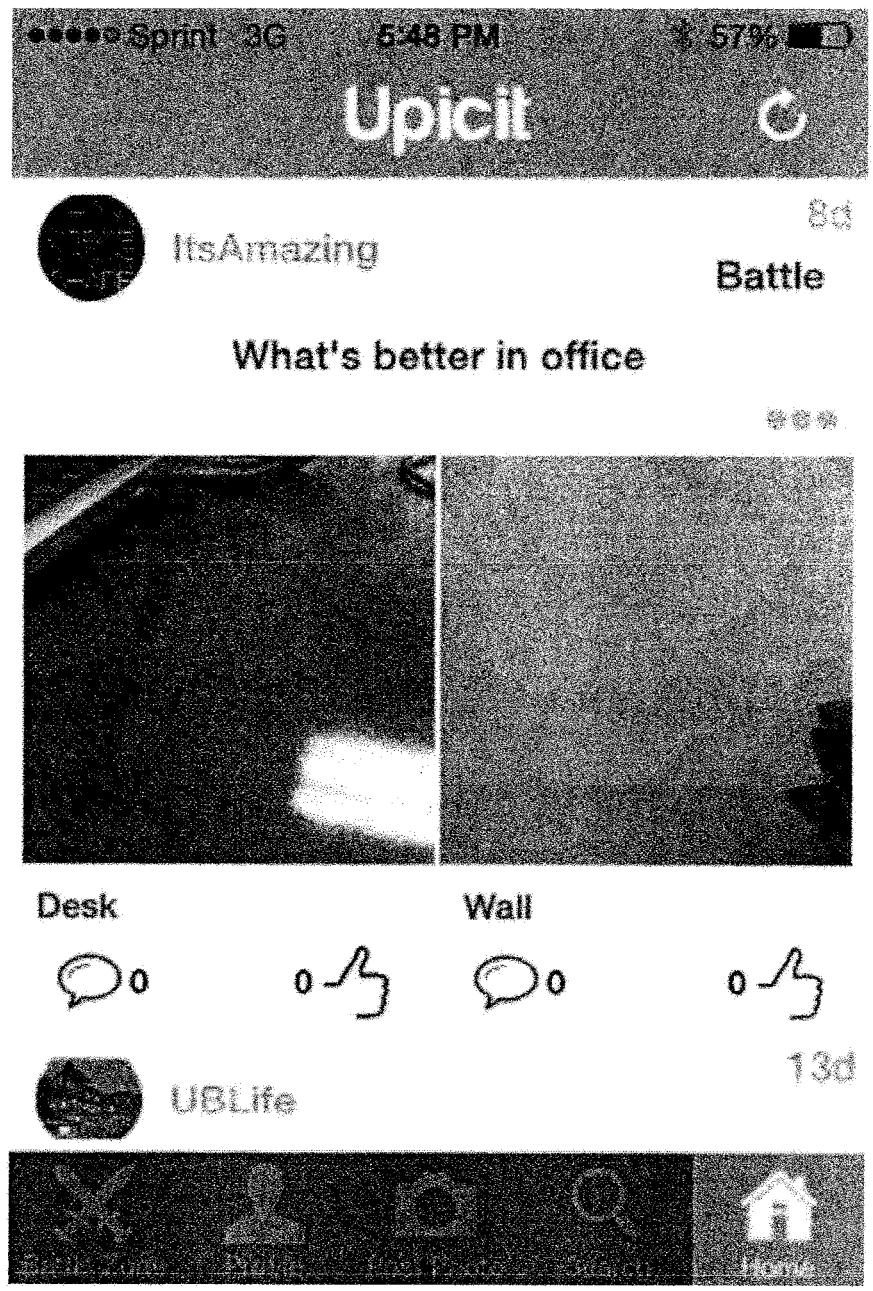
FIGS. 7A and 7B show an example of screen shots of a Post sharing option of FIG. 3 in accordance with the invention.

Referring to FIG. 2B, which is a continuation of the flow-chart of FIG. 2A, there is shown block 217 of a Post photo Icon. Next, at block 219 a message to Post a Question on the first device 101 is displayed. At block 221, the user posts a question, where this posted question may be several types of messages such as a text message, photo message or a video message depends on what the user selects. For example, the user may decide to send a text message that asks "What's better in Office?" The picture message may ask "what's better in office?" A picture of a desk or a wall as shown in FIG. 7A. The video message may ask which video for a period of times, such as a few seconds or a few minutes is better a video of a child dancing or a sunset. This video message may come from a gallery on the first device 101 or be a video taken by first device 101.

Next, at block 223, the Upicit software allows the user to obtain a first picture when asked "What's better in Office?" The first picture may be from either: 1. the gallery of pictures stored on first device 101 or 2. a new picture taken by first device 101. The picture may be from the gallery of pictures on the first device 101, such as picture of a desk stored on the first device 101 that is placed on the left side of the screen page of first device 101 as shown in FIG. 7A. In another embodiment of the invention, the picture may be a video taken from a gallery on the first device 101 or video taken by first device 101. Next, at block 225 the user obtains a second image posted on the right side of the screen page of first device 101. This image may also be from the gallery of pictures stored on the first device 101 or a new picture taken by first device 101. In another embodiment of the invention, the picture may be a video taken from a gallery on the first device 101 or video taken by first device 101. The picture chosen is a picture is from the wall of an office.

Figure 7B:
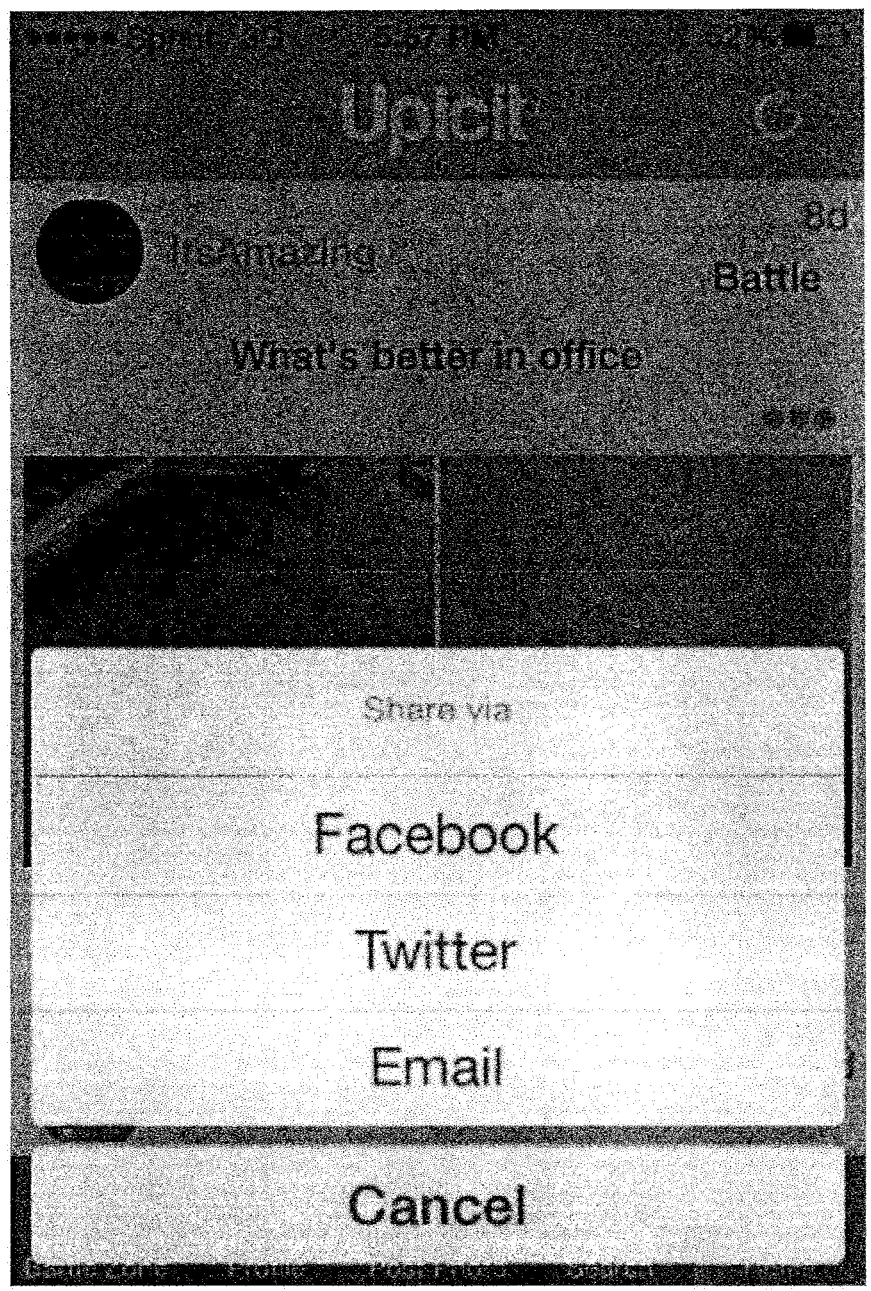

Next, at block 227, the first device 101 inserts words in a Caption that's below the left first picture where the Caption may be simply "Desk". Next, at block 229 the user inserts a right word Caption that's below the right first picture where the Caption word is "wall" as shown in FIG. 7A. At block 231, when both the left first picture and right picture with their respective Caption words are side by side then the user determines if he wants to post the question, images and Caption words. At block 233, the user decides not to post the image and the program ends. At block 235, the user decides to share the screen page of FIG. 7B via Facebook, Twitter, email or any social media website. As shown in FIG. 8, the image is sent by email to an email address of John.Doe@gmail.com where the receiver of the email would be able to see the entire screen page.

Figure 9:
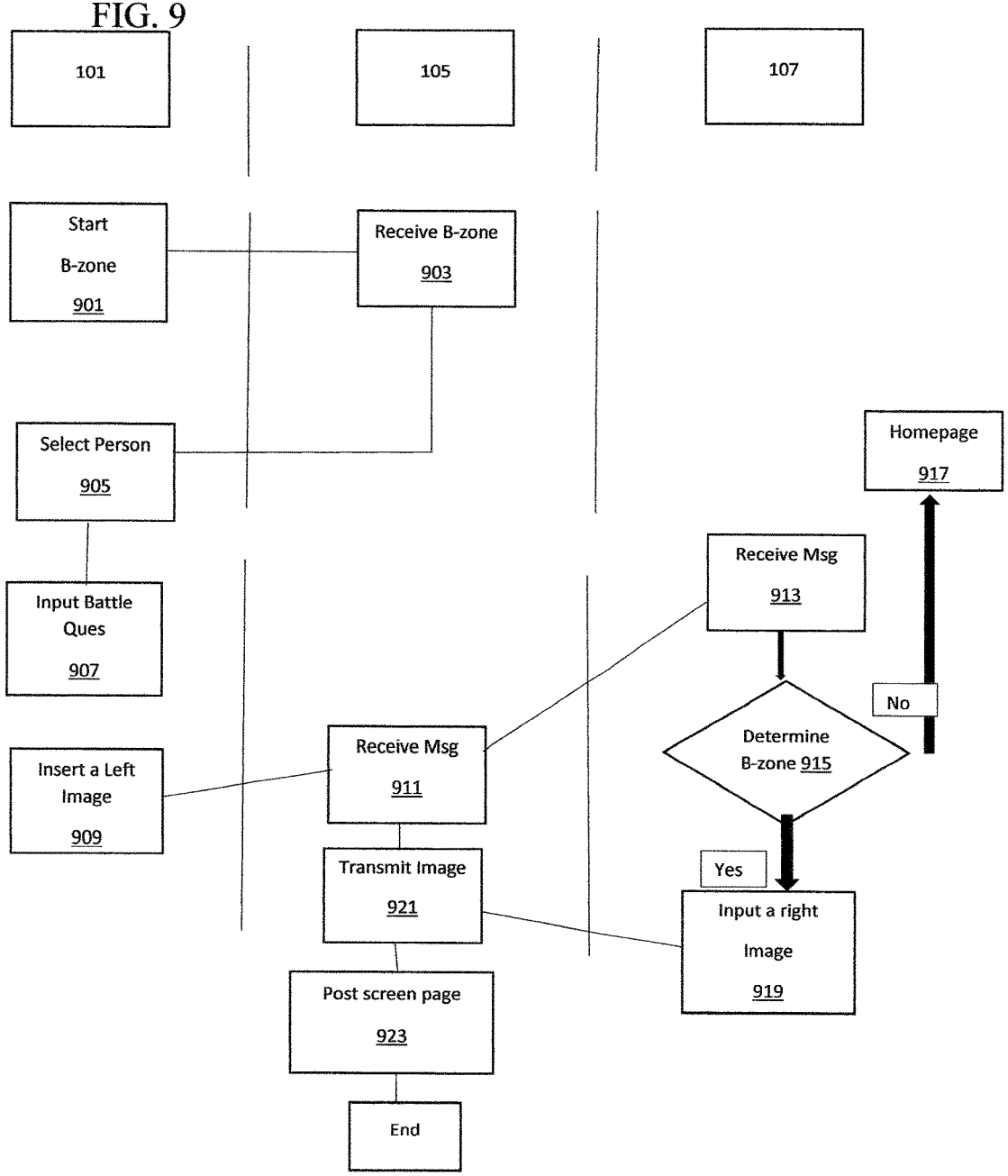
FIG. 9 shows a flow-chart of how communication occurs between a first device, an analysis server and an optional device in accordance with the invention.
Figure 12:
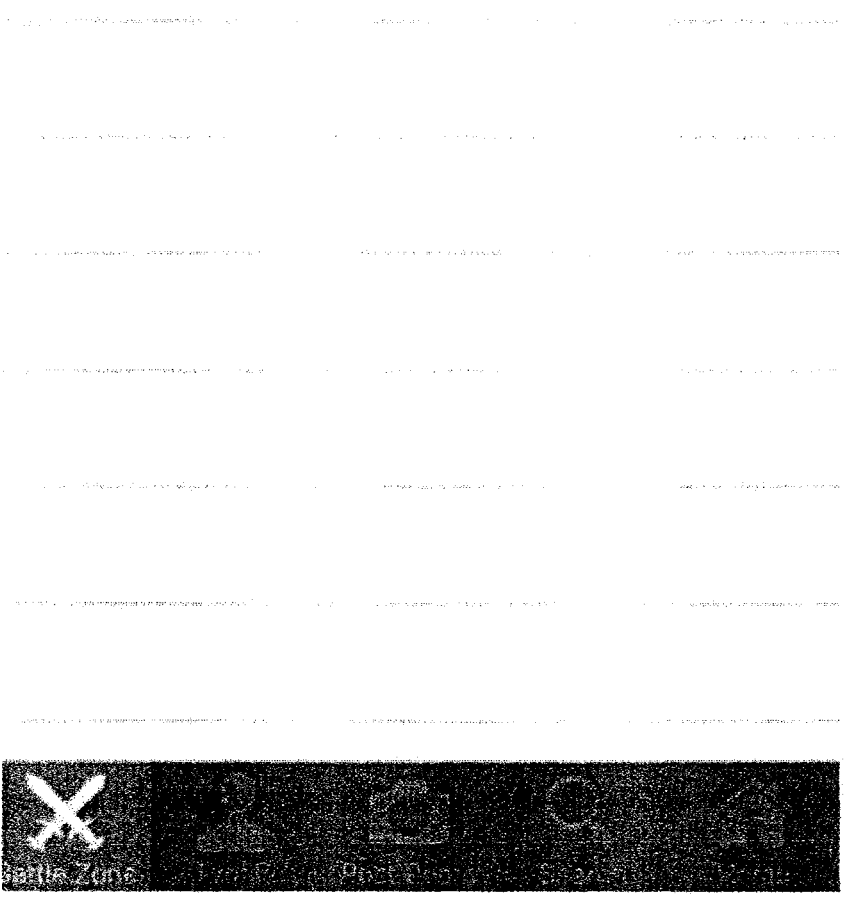
FIG. 12 shows an example of a screen shot showing a search completed of FIG. 11 in accordance with the invention.

FIG. 9 shows a flow-chart of the communication between the first device, the analysis server and a second device. The second device is the optional device 107 disclosed above. The operations by the first device 101, the analysis server 105 and the second device 107 are separated by a dotted line to help clarify the actions in the system. However, no particular technical arrangement is intended by showing the three sides. The labels first device 101, the analysis server 105 and second device 107 are simply indicative of the device that is seeking information and the devices that are providing information. Of course, the roles of the first device 101, the analysis server 105 and the second device 107 may be reversed as appropriate. In addition, the use of the singular form is not meant to be limiting; the first device 101, the analysis server 105 and second device 107 could be one device or a number of devices combined into a system or subsystem.

At block 901, a first user at first device 101 utilizes the web Interface 103 to transmit a message to the analysis server 105 that the first user wants to start a Battle by Battle zone, as disclosed in block 215 of FIG. 2A discussed above, when the first user clicks on the Battle zone Icon as one of the plurality of options shown in FIG. 10. This Upicit application is the first social media software application that allows a user to post at least two pictures/videos at a time. Today's society is consistently indecisive with what to buy, what to wear and even who's the better athlete. However, a user's indecisiveness is a problem of the past, because now the user can post at least two pictures/videos at the same time and have followers of the user give their opinions on what they think is a better choice. Whether the user is looking for advice on where to go or what to wear or just trying to stir up some controversy this Upicit software application provides the user the platform to do so. This software application will give the user the most of the capabilities of other social media giants, while throwing in brand new features. One of the most anticipated features to come to the Upicit software applications is the Battle Zone feature. With the Battle zone feature the user can pick a friend/follower and challenge them to a friendly battle. When the battle is accepted all of the Followers of the user and the Followers of the opposing battler are able to see the battle and Pick the winner. Whoever earns the most Likes wins the Battle and gets a medal that can be found right next to the user notifications. A user's trash talk can be backed up by the Battle Zone feature. The user can request a battle that can be either accepted or denied, so there's no pressure to participate in the battle.

In addition, first user clicks on the Invite icon, as shown in FIG. 10, in order to select a person to have a Battle-Zone communication with. Referring to FIG. 9, at block 903, analysis server 105 receives the message to start the Battle-Zone application and search for an Upicit registered user stored on the analysis server 105 database to battle with that is transmitted back to the first user. At block 905, the first user receives the blank Search message to select who he/she wants to battle with then, the first user inputs the person he/she wants to battle, for this example the person "ItsAmazing" is the person chosen whom is an Upicit registered user shown in FIG. 11. Referring to FIG. 9, at block 905 the first user starts the battle by providing a screen page as shown in FIG. 13 that states "Start a Battle with ItsAmazing". FIG. 13 shows a screen page of the first user that has a screen page with a text box for the Battle Question, a place to tap and capture the image and a word in the Caption.

Returning to FIG. 9, at block 907, the first user inputs a Battle Question, such as what's better in office? At block 909, the first user at FIG. 13 taps at least one image in the middle of the screen page to insert the at least one image from the gallery or allow the program to take a picture. The first user chooses to obtain a picture of a desk that is displayed on the screen page left side of the first user that is transmitted. In another embodiment of the invention, the picture may be a video taken from a gallery on the first user or video taken by the first user. In yet another embodiment of the invention, the first user may write a text message.

Figure 15:
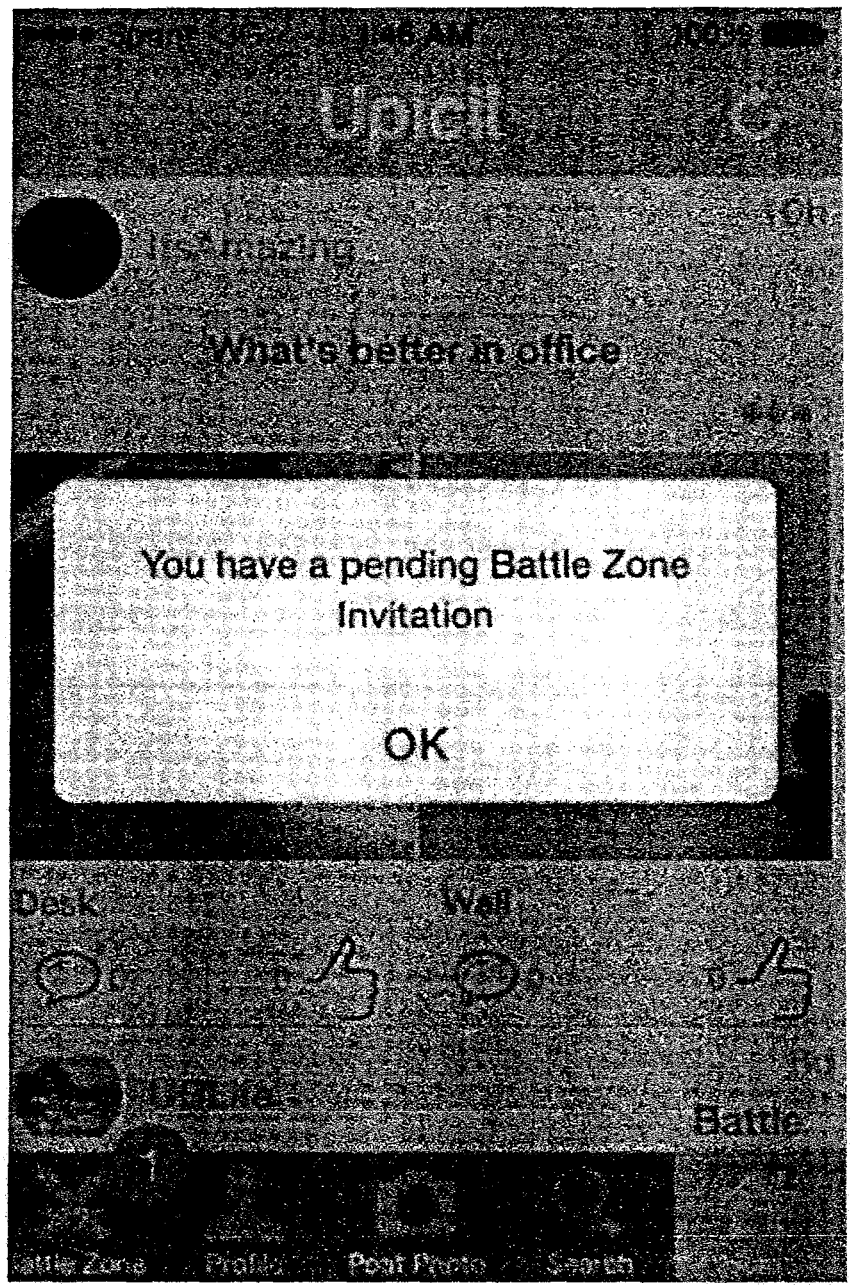
FIG. 15 shows an example of a screen showing a pending Battle-Zone Invitation of FIG. 9 in accordance with the invention.

At block 911, the analysis server 105 receives the message to Post the question and a photo of the office desk, then the analysis server 105 transmit a message to a second user at the second device 107 inviting the second user to battle with the first user at block 913. At block 913, the 2$^{nd}$ user receives a Red dot notification button to participate in Battle zone as shown in FIG. 15. Next, at block 915 the 2$^{nd}$ user determines if he wants to participate in the Battle zone. The 2$^{nd}$ user has a name of "ItsAmazing". If the user ItsAmazing doesn't want to participate then he/she says no or rejects the request, then the process goes to the homepage at block 917, which would be shown on the Notification page of FIG. 16D for UBLife. However, if ItsAmazing does want to participate in the Battle zone then he/she says yes or accepts the Battle Zone request in block 919.

Figure 14:
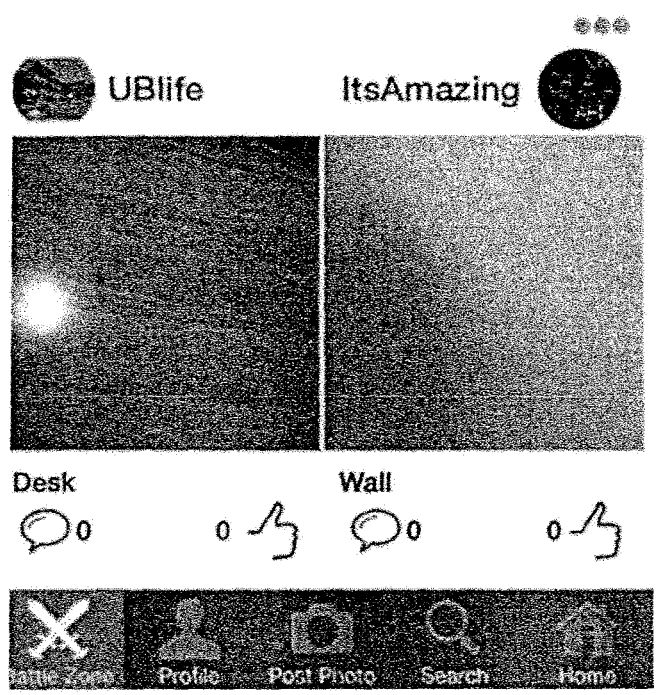
FIG. 14 shows an example of a screen shot showing the Battle-Zone of FIG. 9 in accordance with the invention.

At block 919, the screen page allows the second user to input at least one right sided image of a wall similar to how the first user obtained an image from the gallery or took a picture as shown in FIG. 14. In another embodiment of the invention, the picture may be a video taken from a gallery on the second user or video taken by second user. In yet another embodiment of the invention, the second user may insert a text to reply to the first user's text. At block 921, the second user transmits the entire screen page of FIG. 14 onto the analysis server 107 showing both images from the first user and the second user.

Next, at block 923 both images are posted and shared on the Upicit Battle zone screen page where the followers of the first user 101 and second user 107 receives messages about the Battle zone and allows the Upicit registered users who are followers of the first user and the second user to vote for approximately 1 hour, or any period of time from 15 minutes to 3 hours, who should win the battle between the left image of the first user and the right image of the second user. During the 1 hour time period of sharing the at least one left side image and the at least one right side image, other Upicit application members can vote on which of the 2 images they like the most by clicking the "like" button below the image of their choice and leaving a "comment" if they chose to leave a "comment". The first user or second user that receives the most "likes" at the end of the 1 hour time period will be the Winner of the Battle Zone. Analysis server 105 transmits a message that the Winner will receive 1 of 3 medals which will determine the level ranking which will be Gold, Silver and Bronze "Upicit" medals. Each medal and level will be based on how many "likes" a member receives during a Battle Zone where the Gold medal have a highest level of Likes, Silver next high number of Likes and Bronze the lowest number of Likes. After a member's 1 hour battle is complete the winner's picture and medal will be permanently displayed on the member's, either first device 101 or second device 107, personal profile page unless it is removed by the member herself/himself in an edit your profile feature. So this way all members when viewing the member profile page can see all of the different battles the users has won over the course of being a member of the Upicit (sort of like a badge of honor). Also when other users tap on a particular medal, this would then open up all the info about that battle such as time, date, how many likes, or comments made and also display both the winning and losing pic of that Battle Zone as shown in FIG. 17E. Within the hour, either the first user 101 or second user 107 will be found to be the winner of the Battle zone by having the most likes shown as thumbs up symbol.

This invention provides a simple method for communicating between two devices. A person utilizing a mobile device is able to transmit messages through a web to another device where the first device can compare and rate messages as to determining interface which message is best. This invention provides a simple method for comparing 1 or more objects between two or more devices.

Although the present invention has been described above in terms of specific embodiments, many modifications and variations of this invention can be made as will be obvious to those of ordinary skill in the art, without departing from its spirit and scope as set forth in the following claims.

What is claimed is:

1. A computer implemented method of communicating between devices, comprising:
   selecting a plurality of options at a first user having a first device associated with a specialized program on an analysis server;
   selecting at least one option from the plurality of options at the first device;
   inserting a responsive question associated with the selected at least one option;
   selecting at least one first message and at least one second message associated with the responsive question;
   transmitting the responsive question associated with the selected at least one option with the at least one first message and the at least one second message at a second user having a second device; and receiving the at least one first message and the at least one second message, wherein the at least one first message and the at least one second message is shared to a plurality of followers associated with the at least one first message and a plurality of followers associated with the at least one second message;

at least one second message;

determining a winning message based on a battle at a battle zone, wherein the first user having the at least one message requests to initiate the battle with the second user having the at least one message, wherein the second user accepts the request to battle the first user, wherein at the battle zone between the at least one first message side by side to the at least one second message, wherein the at least one first message includes a first question, a first image and a first plurality of caption words, wherein the at least one second message includes a second question, a second image and a second plurality of caption words, wherein a plurality of followers provides a plurality of likes to the at least one first message and the at least one second message within a period of time wherein based on a highest number of the plurality of likes between the at least one first message or the at least one second message the winning message is determined.

2. The computer implemented method of claim 1, further comprising sharing the winning message on a social networking website.

3. The computer implemented method of claim 2, wherein the social networking website is from the group comprising Facebook, Twitter, and Instagram.

4. The computer implemented method of claimed 3 wherein the at least one first message is from the group comprising a text message, a photo message or a video message.

5. The computer implemented method of claimed 3 wherein the at least one second message is from the group comprising a text message, a photo message or a video message.

6. The computer implemented method of claim 1, where the plurality of option are from the group comprising a Search Icon, Post a photo Icon, a Profile Icon and a Battle-Zone Icon.

7. A system for sharing messages between devices comprising:

a first device associated with a first user connected and second device connected to an analysis server, wherein the analysis server includes a specialized application program;

the analysis server provides the first device and a second user associated with a second device with access to the specialized application program, responsive to the first device receiving access to the specialized application program the first device is configured to transmit a message to the second device;

the second device is configured to determine if the second device will respond to the message from the first device, wherein the second device responding to the message from the first device, the first device is configured to select at least one option from a plurality of options associated with the specialized application program;

the first device is configured to insert a responsive question associated with the selected at least one option from the plurality of options;

the first device selects at least one first message associated with the inserted responsive question associated with the selected at least one option from the plurality of options, wherein the first device transmits the inserted responsive question associated with the selected at least one option from the plurality of options and the at least one first message through the analysis server to the second device, wherein the second device responsive to receiving the inserted responsive question associated with the selected at least one option from the plurality of options and the at least one first message the second device transmits at least one second message through the analysis server to the first device;

the analysis server determines a winning message based on a battle at a battle zone, wherein the first user associated with the first device requests to initiate the battle with the second user having the at least one message, wherein the second device associated with the second user accepts the request to battle the first user, wherein at the battle zone between the first device side by side to the second device, wherein the first device has the at least one first message includes a first question, a first image and a first plurality of caption words, wherein the second device has the at least one second message includes a second question, a second image and a second plurality of caption words, wherein a plurality of followers provides a plurality of likes to the first device and the second device within a period of time wherein based on a highest number of the plurality of likes between the first device and the second device the winning message is determined.

8. The system of claim 7, wherein the selected option of the plurality of options of the specialized application program is a Battle-Zone application.

* * * * *